US010591842B2

(12) United States Patent
Yamamura

(10) Patent No.: US 10,591,842 B2
(45) Date of Patent: Mar. 17, 2020

(54) LENS ARRAY, LENS UNIT, EXPOSURE DEVICE, LED HEAD, AND IMAGE FORMING APPARATUS

(71) Applicant: Oki Data Corporation, Tokyo (JP)

(72) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/129,256

(22) Filed: Sep. 12, 2018

(65) Prior Publication Data

US 2019/0094747 A1 Mar. 28, 2019

(30) Foreign Application Priority Data

Sep. 27, 2017 (JP) ................. 2017-185569

(51) Int. Cl.
| | | |
|---|---|---|
| *G03G 15/04* | (2006.01) | |
| *G02B 9/04* | (2006.01) | |
| *G02B 27/09* | (2006.01) | |
| *G02B 3/02* | (2006.01) | |
| *G02B 3/00* | (2006.01) | |

(52) U.S. Cl.
CPC ....... *G03G 15/04054* (2013.01); *G02B 3/005* (2013.01); *G02B 3/0037* (2013.01); *G02B 3/0062* (2013.01); *G02B 3/0068* (2013.01); *G02B 3/02* (2013.01); *G02B 9/04* (2013.01); *G02B 27/0961* (2013.01)

(58) Field of Classification Search
CPC .. G02B 3/0056; G02B 3/0062; G02B 3/0068; G02B 3/02; G02B 27/0961; G02B 9/04; G03G 15/04054
See application file for complete search history.

(56) References Cited

U.S. PATENT DOCUMENTS

| | | | | | |
|---|---|---|---|---|---|
| 5,291,334 | A | * | 3/1994 | Wirth ................... | G02B 3/0056 359/435 |
| 5,359,440 | A | * | 10/1994 | Hamada .............. | G02B 3/0012 349/8 |
| 5,684,548 | A | * | 11/1997 | Ariki ................. | G02F 1/133526 348/E9.027 |
| 5,719,706 | A | * | 2/1998 | Masumoto ........... | G02B 3/0056 348/E5.141 |
| 5,748,375 | A | * | 5/1998 | Yamana ............... | G02B 3/0056 359/621 |
| 2009/0237802 | A1 | * | 9/2009 | Yamamura ........... | G03G 15/326 359/622 |
| 2014/0160573 | A1 | * | 6/2014 | Teramura ............. | G02B 3/0056 359/619 |
| 2015/0277215 | A1 | * | 10/2015 | Sudo .................... | G03B 21/208 353/38 |

FOREIGN PATENT DOCUMENTS

JP 2009-223186 A 10/2009

\* cited by examiner

*Primary Examiner* — John Zimmermann
(74) *Attorney, Agent, or Firm* — Rabin & Berdo, P.C.

(57) ABSTRACT

Provided are a lens array, a lens unit, an exposure device, an LED head, and an image forming apparatus. The lens array includes a plurality of lenses arranged so as to form an array. Each of the plurality of lenses is configured so that a contour focal length which is a focal length of a ray incident on a first position separate from an optical axis is longer than a paraxial focal length which is a focal length of a ray incident on a second position in the vicinity of the optical axis.

11 Claims, 20 Drawing Sheets

LENS ARRAY, LENS UNIT, EXPOSURE DEVICE, LED HEAD, AND IMAGE FORMING APPARATUS

BACKGROUND OF THE INVENTION

1. Field of the Invention

The present invention relates to a lens array, a lens unit, an exposure device, an LED head, and an image forming apparatus.

2. Description of the Related Art

An image forming apparatus of the electrophotographic type employs an exposure device including an array of a plurality of light-emitting elements (e.g., LED elements). The exposure device includes a lens array as an array of a plurality of lenses for condensing light beams emitted from the light-emitting elements to form images. See Japanese Patent Application Publication No. 2009-223186 (FIG. 2 to FIG. 3), for example.

However, in the exposure device described above, there are cases where the light beam shape varies at intervals (cycles) equal to an array interval of the lenses. It may lead to the occurrence of vertical stripes at the same intervals in a printed image.

SUMMARY OF THE INVENTION

The present invention has been made to resolve the above-described problem, and its object is to inhibit the occurrence of vertical stripes and improve quality of a printed image.

According to an aspect of the present invention, a lens array includes a plurality of lenses arranged so as to form an array, wherein each of the plurality of lenses has an optical axis, and each of the plurality of lenses is configured so that a contour focal length which is a focal length of a ray incident on a first position separate from the optical axis is longer than a paraxial focal length which is a focal length of a ray incident on a second position in the vicinity of the optical axis.

According to another aspect of the present invention, a lens unit includes a first lens array including a plurality of first lenses arranged so as to form an array; and a second lens array including a plurality of second lenses arranged so as to form an array. Optical axes of the plurality of second lenses respectively coincide with optical axes of the plurality of first lenses. Each of the plurality of first lenses is configured so that a first contour focal length which is a focal length of a ray incident on a first position separate from the optical axis is longer than a first paraxial focal length which is a focal length of a ray incident on a second position in the vicinity of the optical axis. Each of the plurality of second lenses is configured so that a second contour focal length which is a focal length of a ray incident on a third position separate from the optical axis is longer than a second paraxial focal length which is a focal length of a ray incident on a fourth position in the vicinity of the optical axis.

According to the present invention, the variation in the light beam shape can be inhibited, by which the occurrence of vertical stripes in a printed image can be inhibited.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment
(Configuration of Printer)

Figure 1:
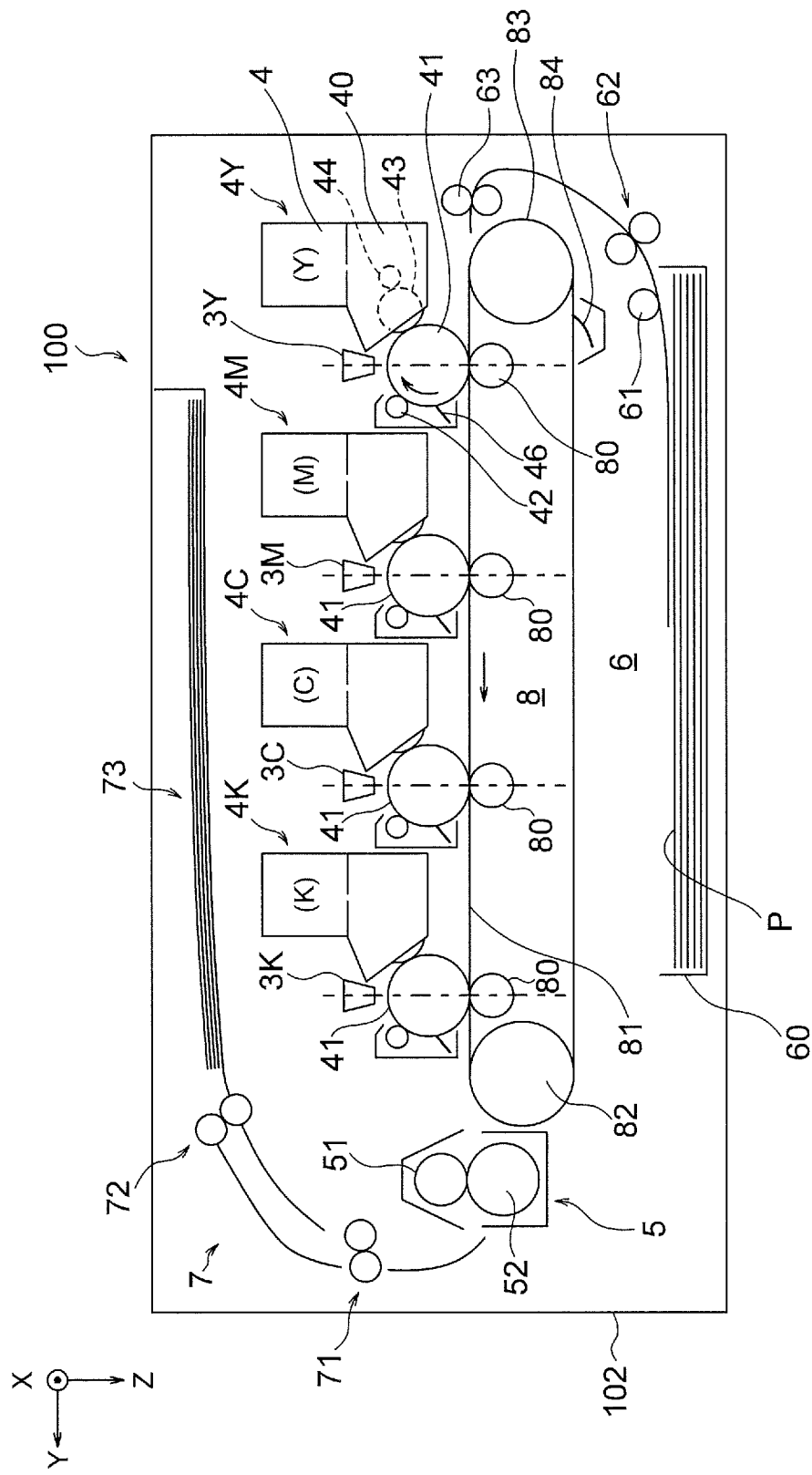
FIG. 1 is a diagram showing an overall configuration of a color printer according to a first embodiment.

FIG. 1 is a diagram showing an overall configuration of a printer 100 as an image forming apparatus according to a first embodiment of the present invention. The printer 100, configured as a color printer of the electrophotographic type, forms an image on a medium by using toners as developing agents containing pigments (i.e., coloring agents).

The printer 100 includes a sheet feed conveyance section 6 for feeding a sheet P as the medium, process units 4Y, 4M, 4C and 4K as image forming units for forming toner images of yellow (Y), magenta (M), cyan (C) and black (K), a transfer unit 8 for transferring the toner images to the sheet P, a fixation unit 5 for fixing the toner images on the sheet P, and an ejection unit 7 for ejecting the sheet P to the outside of the printer 100. These components are accommodated in a housing 102 of the printer 100.

The sheet feed conveyance section 6 includes a sheet feed cassette 60 that stores sheets P in a stacked state, a sheet feed roller 61 that extracts a sheet P from the sheet feed cassette 60, and conveyance roller pairs 62 and 63 that convey the sheet P extracted by the sheet feed roller 61.

The process units 4Y, 4M, 4C and 4K are arranged in a line, right to left in FIG. 1, along a conveyance path of the sheet P. The process units 4Y, 4M, 4C and 4K, having a common configuration except for the toner used, can be collectively referred to as process units 4.

LED heads 3Y, 3M, 3C and 3K as exposure devices are arranged to respectively face photosensitive drums 41 (described later) of the process units 4Y, 4M, 4C and 4K. The LED heads 3Y, 3M, 3C and 3K can be collectively referred to as LED heads 3.

Each process unit 4 includes the photosensitive drum 41 as an electrostatic latent image bearing body, a charging roller 42 as a charging member for uniformly charging a surface of the photosensitive drum 41, a development device 40 that forms a toner image by developing an electrostatic latent image formed on the surface of the photosensitive drum 41 by using the toner, and a cleaning blade 46 that removes the toner remaining on the surface of the photosensitive drum 41.

The photosensitive drum 41, produced by forming a photosensitive layer on the surface of a conductive support in a cylindrical shape, rotates clockwise in FIG. 1. The charging roller 42, arranged to contact the surface of the photosensitive drum 41, rotates following the rotation of the photosensitive drum 41. The charging roller 42 is supplied with charging voltage and uniformly charges the surface of the photosensitive drum 41.

The LED head 3 irradiates the surface of the photosensitive drum 41 with light based on image data to form an electrostatic latent image on the surface of the photosensitive drum 41. The specific configuration of the LED head 3 will be described later.

The development device 40 includes a development roller 43 as a developing agent bearing body and a supply roller 44 as a supply member. The development roller 43, arranged to contact the surface of the photosensitive drum 41, rotates in a direction (counterclockwise in FIG. 1) opposite to the rotation direction of the photosensitive drum 41. The development roller 43 is supplied with development voltage and develops the electrostatic latent image on the surface of the photosensitive drum 41 by using the toner. The supply roller 44, arranged to contact the surface of the development roller 43, supplies the toner to the development roller 43. A toner cartridge 45 for supplying the toner is attached to an upper part of the development device 40.

The transfer unit 8 includes an endless transfer belt 81 that holds the sheet P on its surface and conveys the sheet P, a drive roller 82 and a driven roller 83 between which the transfer belt 81 is stretched, four transfer rollers 80 arranged to respectively face the photosensitive drums 41 via the transfer belt 81, and a cleaning blade 84 that removes the toners adhering to the transfer belt 81.

Each transfer roller 80 is supplied with transfer voltage and transfers the toner image on the surface of each photosensitive drum 41 to the sheet P on the transfer belt 81. The drive roller 82 rotates counterclockwise in FIG. 1 and makes the transfer belt 81 travel in a direction indicated by an arrow. The driven roller 83 applies tension to the transfer belt 81. The transfer belt 81 electrostatically attracts the sheet P to its surface and conveys the sheet P along the process units 4Y, 4M, 4C and 4K. The cleaning blade 84 is arranged to contact the surface of the transfer belt 81 and scrapes off the toners adhering to the transfer belt 81.

The fixation unit 5 includes a fixation roller 51 and a pressure roller 52. The fixation roller 51 includes a built-in heat source such as a halogen lamp. The pressure roller 52 is pressed against the fixation roller 51 to form a fixation nip between the fixation roller 51 and the pressure roller 52. The fixation roller 51 and the pressure roller 52 fix the toner image transferred to the sheet P by applying heat and pressure to the toner image.

The ejection unit 7 includes ejection roller pairs 71 and 72 for ejecting the sheet P after passing through the fixation unit 5. An upper cover of the printer 100 is provided with a stacker part 73 on which the ejected sheets P are stacked.

The printer 100 further includes an external interface that receives print data by communicating with an external device and a control section that performs overall control of the printer 100 based on the received print data. Detailed description of these components is omitted.

In FIG. 1, a direction parallel to a rotation axis of the photosensitive drum 41 is defined as an X direction. A direction parallel to a moving direction of the sheet P when the sheet P passes through the process units 4Y, 4M, 4C and 4K is defined as a Y direction. A direction orthogonal to both the X direction and the Y direction is defined as a Z direction. The Z direction is a vertical direction in this example.

In regard to the Y direction, a traveling direction of the sheet P when the sheet P passes through the process units 4Y, 4M, 4C and 4K (i.e., a direction from right to left in FIG. 1) is defined as a +Y direction, and a direction opposite to the +Y direction is defined as a −Y direction. In regard to the Z direction, a direction heading from the LED head 3 toward the photosensitive drum 41 (i.e., a downward direction in FIG. 1) is defined as a +Z direction, and a direction opposite to the +Z direction is defined as a −Z direction. In regard to the X direction, a direction heading toward the front side of FIG. 1 is defined as a +X direction, and a direction heading toward the back side of FIG. 1 is defined as a −X direction.

(Configuration of LED Head)

Figure 2:
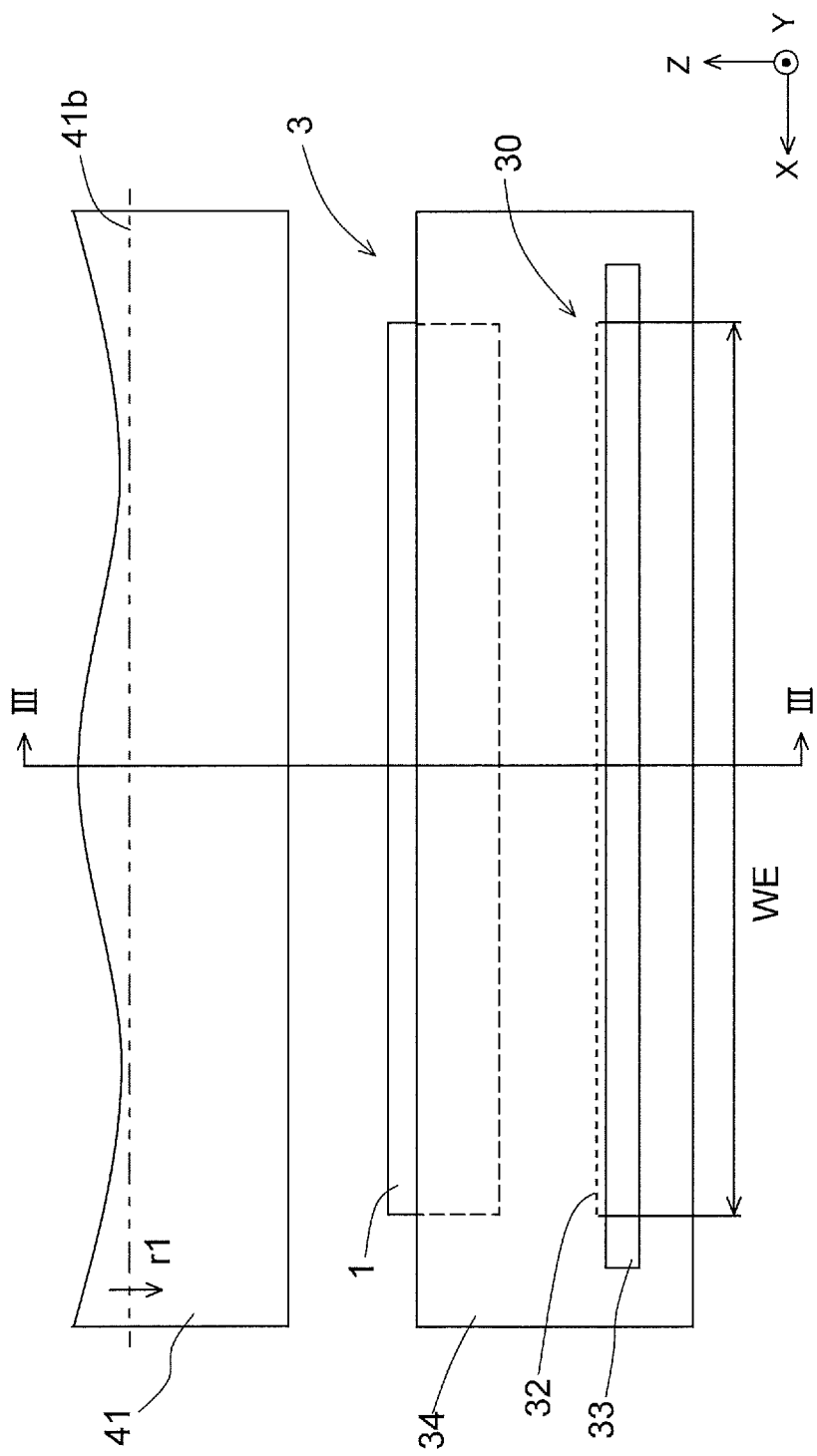
FIG. 2 is a diagram showing a positional relationship between an LED head and a photosensitive drum in the first embodiment.

FIG. 2 is a diagram showing the LED head 3 and the photosensitive drum 41 viewed from the +Y side. In FIG. 2, the +Z direction is an upward direction and the −Z direction is a downward direction (vertically inverted from FIG. 1). The photosensitive drum 41 rotates in a direction indicated by an arrow r1 in FIG. 2.

Each LED head 3 includes a lens unit 1, an LED array 30 as a light emission section, and a holder 34. The holder 34 holds the lens unit 1 and the LED array 30 in a predetermined positional relationship. The LED array 30 includes a plurality of LED elements 32 as a plurality of light-emitting elements substantially linearly arrayed in a line on a circuit board 33. The circuit board 33 is supported by a base 35 (FIG. 3) and mounted on the holder 34. Further, the LED array 30 can be replaced by a light-emitting thyristor array including a plurality of light-emitting thyristor elements as a plurality of light-emitting elements substantially linearly arrayed.

An array direction of the LED elements 32 is the X direction (i.e., the direction parallel to the rotation axis of the photosensitive drum 41). The length WE of the LED array 30 is 208 mm in this example. Each lens unit 1 is long-shaped and is held by the holder 34 so that a lengthwise direction of the lens unit 1 coincides with the X direction. Namely, each LED head 3 is arranged so that the array direction of the LED elements 32 of the LED array 30 and the lengthwise direction of the lens unit 1 are both in the X direction.

Figure 3:
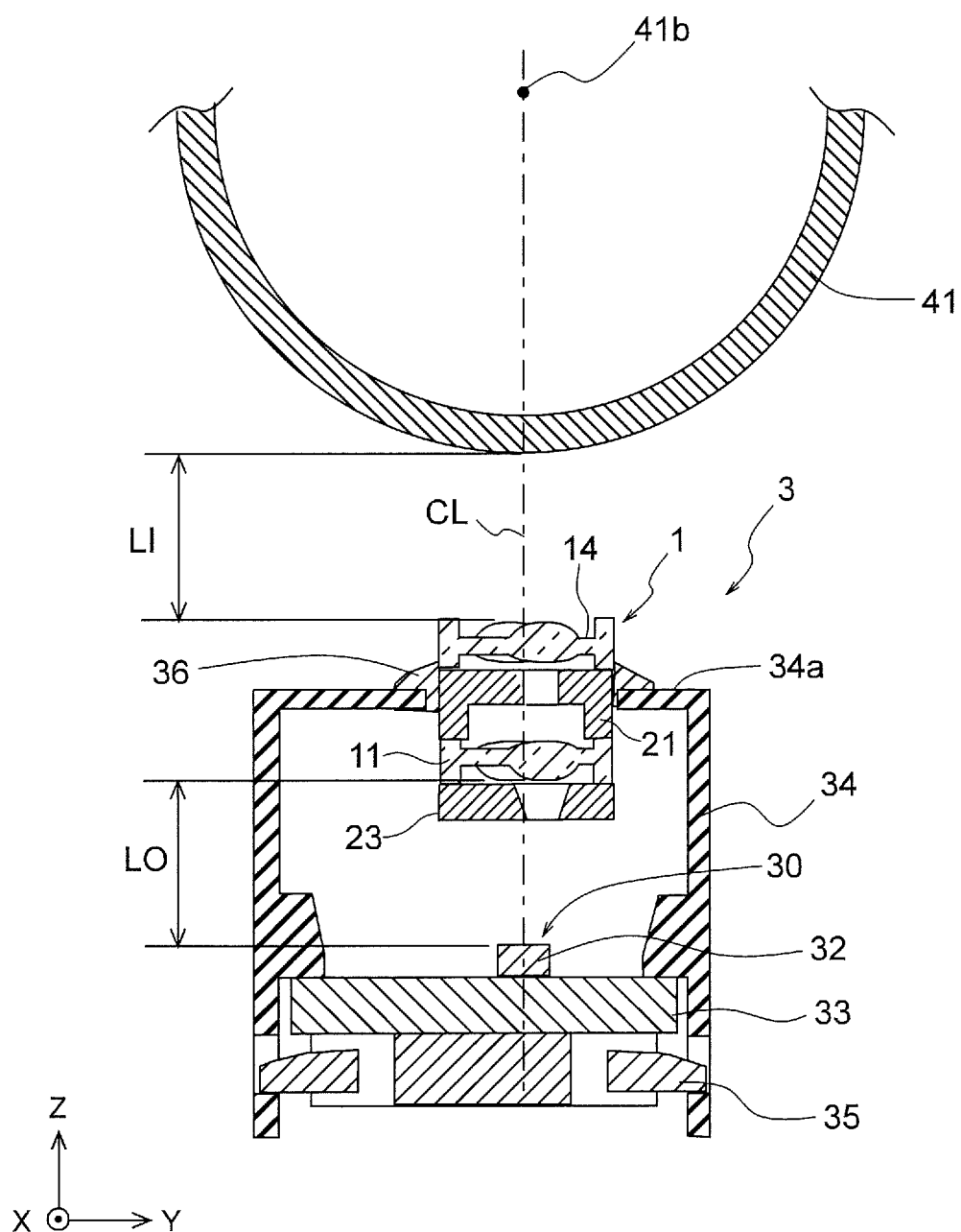
FIG. 3 is a cross-sectional view taken along a line in FIG. 2 when viewed in a direction of arrows.
Figure 4:
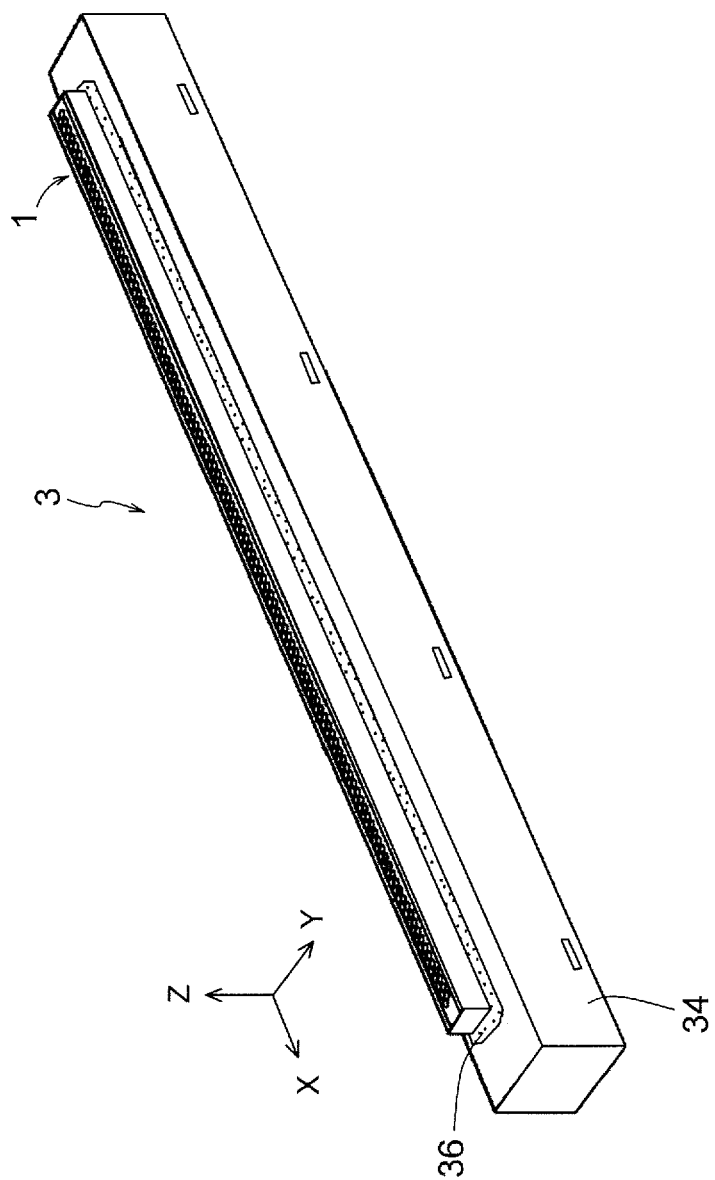
FIG. 4 is a perspective view showing external appearance of the LED head of the first embodiment.

FIG. 3 is a cross-sectional view taken along a line in FIG. 2 when viewed in a direction of the arrows. FIG. 4 is a perspective view showing external appearance of the LED head 3. As shown in FIG. 3, a center of the lens unit 1 in the Y direction is referred to as CL. The LED elements 32 and the rotation axis 41b of the photosensitive drum 41 are situated at the center CL of the lens unit 1 in the Y direction.

The lens unit 1 is inserted into an opening formed through an upper surface part 34a of the holder 34 and is fixed by using an adhesive agent or the like. The gap between the lens unit 1 and the opening of the holder 34 is sealed up with a seal member 36 to prevent leakage of light.

A distance LO from a light emission surface of the LED elements 32 to a lens surface of the lens unit 1 (i.e., a lens surface 12 which will be described later) and a distance LI from the surface of the photosensitive drum 41 to a lens surface of the lens unit 1 (i.e., a lens surface 16 which will be described later) are equal to each other (i.e., LI=LO). The optical axis of each lens of the lens unit 1 extends in the Z direction.

The LED head 3 has a resolution of 600 dpi or 1200 dpi, for example. In the case of 600 dpi, 600 LED elements 32 (FIG. 2) are arranged per inch (approximately 25.4 mm). In this case, the array pitch of the LED elements 32 is approximately 0.042333 mm. The center value of emission wavelengths of the LED elements 32 is 770 nm, for example.

Figure 5:
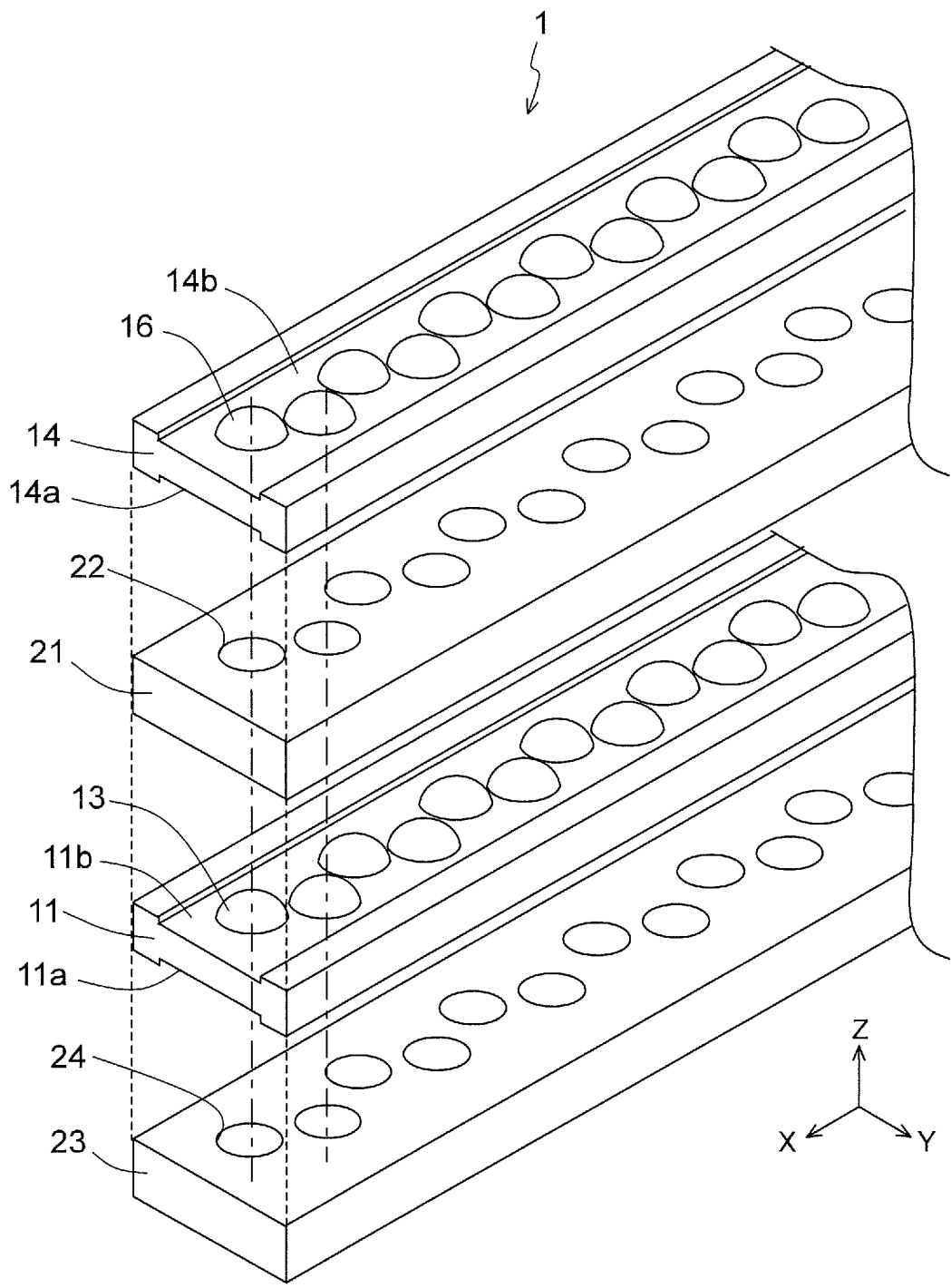
FIG. 5 is an exploded perspective view magnifying the vicinity of an end of a lens unit of the first embodiment.

FIG. 5 is an exploded perspective view magnifying the vicinity of an end of the lens unit 1. As shown in FIG. 5, the lens unit 1 includes a mask 23, a first lens plate 11 as a first lens array, a light blocking plate 21 as a light blocking member, and a second lens plate 14 as a second lens array, which are arranged in a traveling direction of the light beams emitted from the LED elements 32 (FIG. 3).

The first lens array as the first lens plate 11 includes a plurality of first lenses (i.e., a plurality of first lens surfaces 12 and 13 shown in FIG. 7) arranged so as to form an array. The second lens array as the second lens plate 14 includes a plurality of second lenses (i.e., a plurality of second lens surfaces 16 and 15 shown in FIG. 7) arranged so as to form an array. Optical axes of the plurality of second lenses respectively coincide with optical axes of the plurality of first lenses.

Each of the plurality of first lenses is configured so that a first contour focal length which is a focal length (e.g., FE shown in FIG. 11) of a ray incident on a first position separate from the optical axis is longer than a first paraxial focal length which is a focal length (e.g., FA shown in FIG. 11) of a ray incident on a second position in the vicinity of the optical axis. Further, each of the plurality of second lenses is configured so that a second contour focal length which is a focal length (e.g., FE shown in FIG. 11) of a ray incident on a third position separate from the optical axis is longer than a second paraxial focal length which is a focal length (e.g., FA shown in FIG. 11) of a ray incident on a fourth position in the vicinity of the optical axis. In each of the plurality of first lenses, the second position is closer to the optical axis than the first position. Further, in each of the plurality of second lenses, the fourth position is closer to the optical axis than the third position. This will be described later in detail with reference to FIG. 7 and FIG. 11.

On a back surface 11b as a surface of the first lens plate 11 on the +Z side, a plurality of lens surfaces 13 are arrayed in the X direction. On a back surface 14b as a surface of the second lens plate 14 on the +Z side, a plurality of lens surfaces 16 are arrayed in the X direction. The first lens plate 11 and the second lens plate 14 are formed of material that allows the light beams emitted from the LED elements 32 (FIG. 3) to pass through.

The light blocking plate 21 has a plurality of openings 22 arrayed in the X direction. The mask 23 has a plurality of openings 24 arrayed in the X direction. The light blocking plate 21 and the mask 23 are formed of material that does not allow the light beams emitted from the LED elements 32 (FIG. 3) to pass through. The positions of the openings 22 and the openings 24 in the X direction and the Y direction (i.e., positions of the openings 22 and the openings 24 in an XY plane) coincide with the positions of the lens surfaces 13 and 16 in the X direction and the Y direction.

Although not shown in FIG. 5, on a front surface 11a which is a surface of the first lens plate 11 on the −Z side, a plurality of lens surfaces 12 (FIG. 7) are arrayed in the X direction. Similarly, on a front surface 14a which is a surface of the second lens plate 14 on the −Z side, a plurality of lens surfaces 15 (FIG. 7) are arrayed in the X direction.

Figure 6:
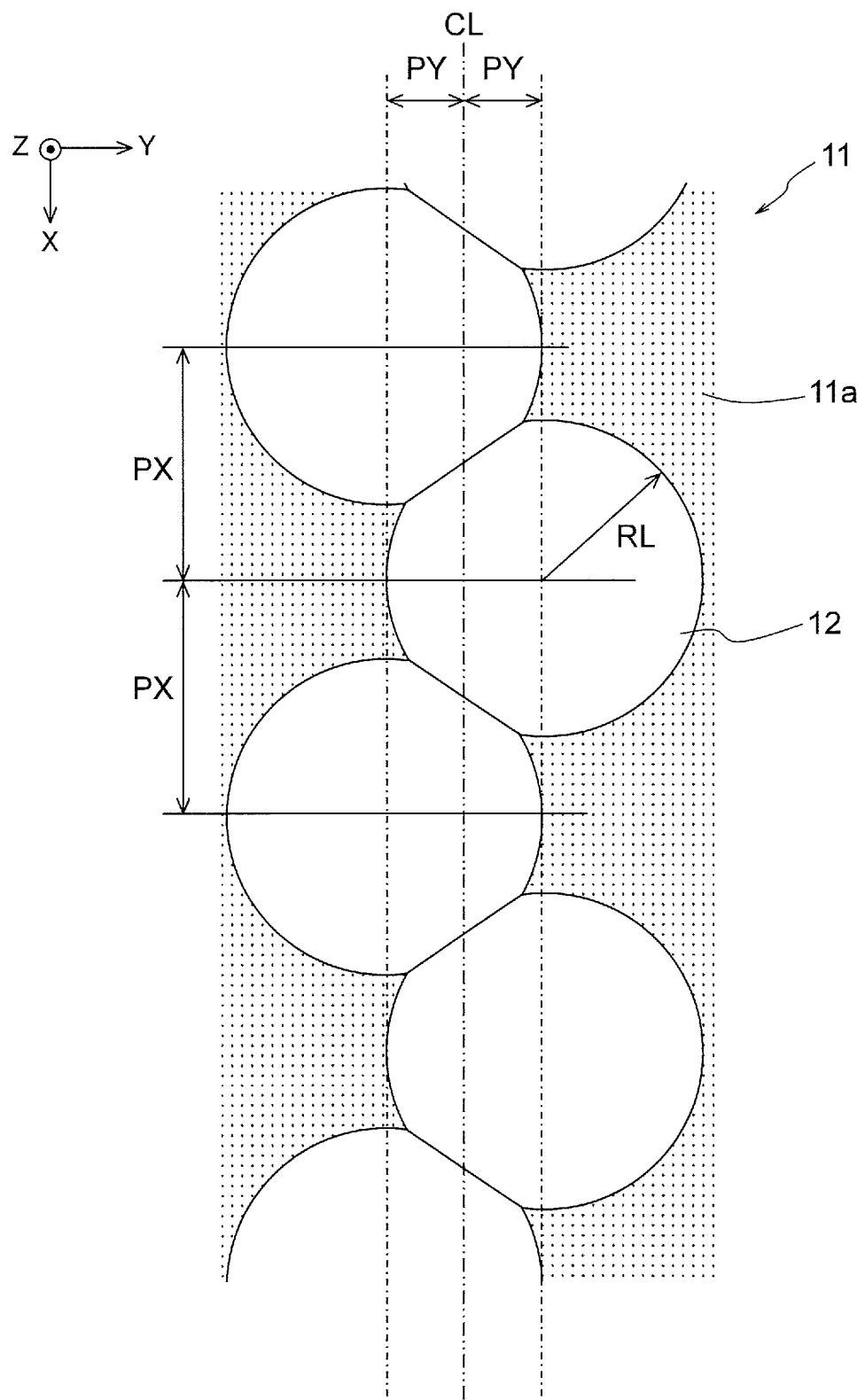
FIG. 6 is a diagram showing an array of lens surfaces of a first lens plate of the lens unit of the first embodiment.

FIG. 6 is a diagram as a transparent view of the array of the lens surfaces 12, on the front surface 11a(i.e., surface on the −Z side) of the first lens plate 11 shown in FIG. 5, viewed from the +Z side. As shown in FIG. 6, on the front surface 11a of the first lens plate 11, a plurality of lens surfaces 12 are arranged in two lines in a zigzag fashion, with each line extending in the X direction. Let PX represent an interval (i.e., center-to-center distance) of adjacent lens surfaces 12 in the X direction, an array interval of the lens surfaces 12 in each line in the X direction is 2×PX.

The center (i.e., surface vertex) of each lens surface 12 is situated at a distance PY from the center of the first lens plate 11 in the Y direction (i.e., the center CL of the lens unit 1 in the Y direction). The radius of each lens surface 12 is RL. A part of the front surface 11a of the first lens plate 11 where no lens surface 12 is formed is a flat surface.

The lens surfaces 13 on the back surface 11b of the first lens plate 11, the lens surfaces 15 on the front surface 14a of the second lens plate 14, and the lens surfaces 16 on the back surface 14b of the second lens plate 14 are arranged in the XY planes in the same way as the lens surfaces 12 on the front surface 11a of the first lens plate 11.

Further, the lens surfaces 12 and 13 are formed integrally with other parts of the first lens plate 11. The lens surfaces 15 and 16 are formed integrally with other parts of the second lens plate 14.

Figure 7:
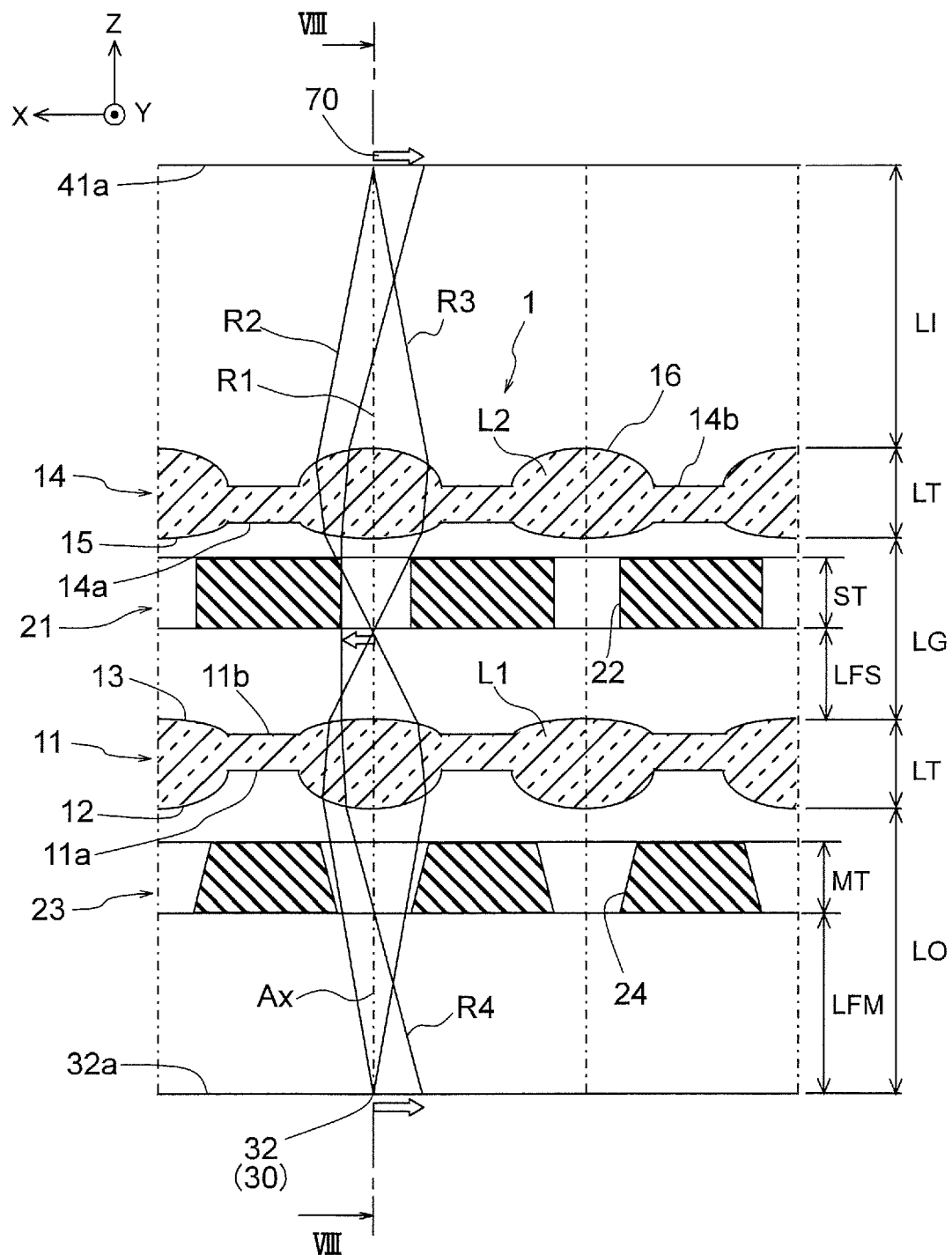
FIG. 7 is a cross-sectional view of the lens unit of the first embodiment taken along a plane parallel to an XZ plane.
Figure 8:
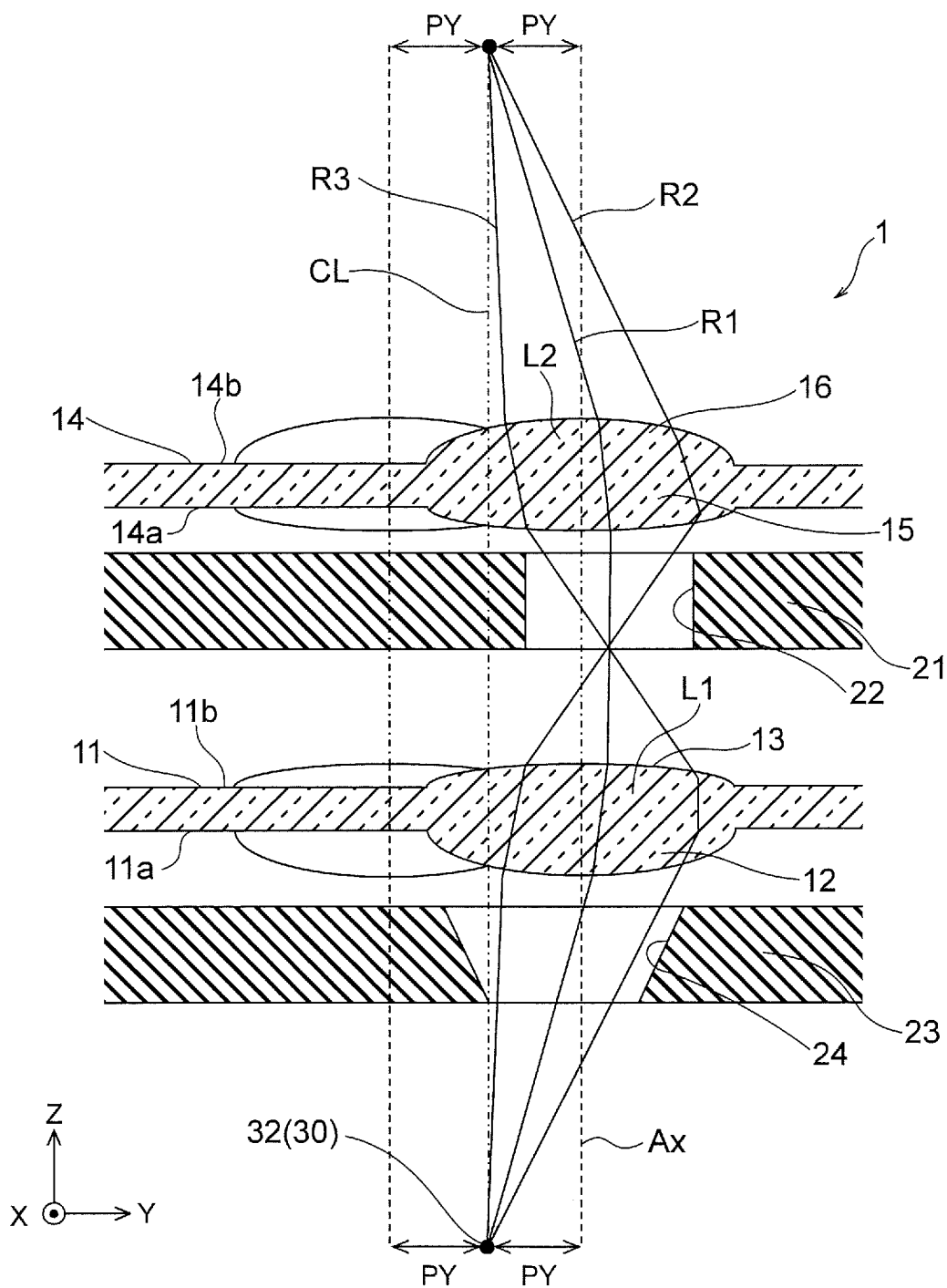
FIG. 8 is a cross-sectional view of the lens unit of the first embodiment taken along a plane parallel to a YZ plane.

FIG. 7 is a cross-sectional view of the lens unit 1 taken along a plane passing through surface vertices of the lens surfaces 12, 13, 15 and 16 and parallel to an XZ plane. FIG. 8 is a cross-sectional view taken along a line VIII-VIII in FIG. 7 when viewed in a direction of arrows.

The LED array 30 is arranged on the −Z side of the lens unit 1, while an image formation surface (i.e., the surface 41a of the photosensitive drum 41) is arranged on the +Z side of the lens unit 1. The mask 23 and the light blocking plate 21 block unnecessary light (e.g., stray light and flare light) not contributing to the image formation. The positions of the openings 22 and 24 in the X direction coincide with the positions of the lens surfaces 12, 13, 15 and 16 in the X direction.

A distance from the light emission surface 32a of the LED array 30 to the lens surfaces 12 of the first lens plate 11 is assumed to be the distance LO. An interval between the lens surface 12 and the lens surface 13 (i.e., lens thickness) of the first lens plate 11 is assumed to be a surface interval LT. An interval between the lens surface 13 of the first lens plate 11 and the lens surface 15 of the second lens plate 14 is assumed to be a surface interval LG. An interval between the lens surface 15 and the lens surface 16 (i.e., lens thickness) of the second lens plate 14 is assumed to be a surface interval LT. A distance between the lens surface 16 of the second lens plate 14 to the surface 41a (i.e., image formation surface) of the photosensitive drum 41 is assumed to be the distance LI.

Further, an interval between the light emission surface 32a of the LED array 30 and the mask 23 is assumed to be a surface interval LFM. An interval between the lens surface 13 of the first lens plate 11 and the light blocking plate 21 is assumed to be a surface interval LFS. The thickness of the mask 23 is assumed to be a thickness MT. The thickness of the light blocking plate 21 is assumed to be a thickness ST.

As shown in FIG. 7, the lens surfaces 12 and 13 of the first lens plate 11 facing each other form a lens L1 (i.e., the first lens). The lens surfaces 15 and 16 of the second lens plate 14 facing each other form a lens L2 (i.e., the second lens). The lenses L1 and L2 have a common optical axis Ax. The direction of the optical axis Ax is the Z direction. The lens L1 has a magnification of ½, for example. The lens L2 has a magnification of 2, for example.

The reference character R1 represents a path of a principal ray of a light beam emitted from an LED element 32 in the vicinity of the optical axis Ax of the lenses L1 and L2. The reference character R4 represents a path of a principal ray of a light beam emitted from the LED element 32 separate from the optical axis Ax.

The first lens plate 11 and the second lens plate 14 have a telecentric configuration in which the principal rays are parallel to each other between the lens surface 13 and the lens surface 15. This configuration is implemented by forming the lens L1 of the first lens plate 11 and the lens L2 of the second lens plate 14 substantially in the same shape and setting the distance LO from the object to the first lens plate 11 and the distance LI from the second lens plate 14 to the image formation surface to be substantially equal to each other.

In FIG. 8, the paths of the principal rays of a light beam emitted from the LED element 32 is represented by R1, R2 and R3. R1 represents a path of the principal ray of the light beam emitted from the LED element 32. As mentioned above, the lens plates 11 and 14 have the telecentric configuration in which the principal rays are parallel to each other between the lens surface 13 and the lens surface 15. The positions in the Y direction of the surface vertices of the lens surfaces 12, 13, 15 and 16 are positions at the distance PY from the center CL of the lens unit 1 (i.e., the position of the LED elements 32) in the Y direction. Further, the positions in the Y direction of the openings 22 and 24 coincide with the positions in the Y direction of the lens surfaces 12, 13, 15 and 16.

Figure 9:
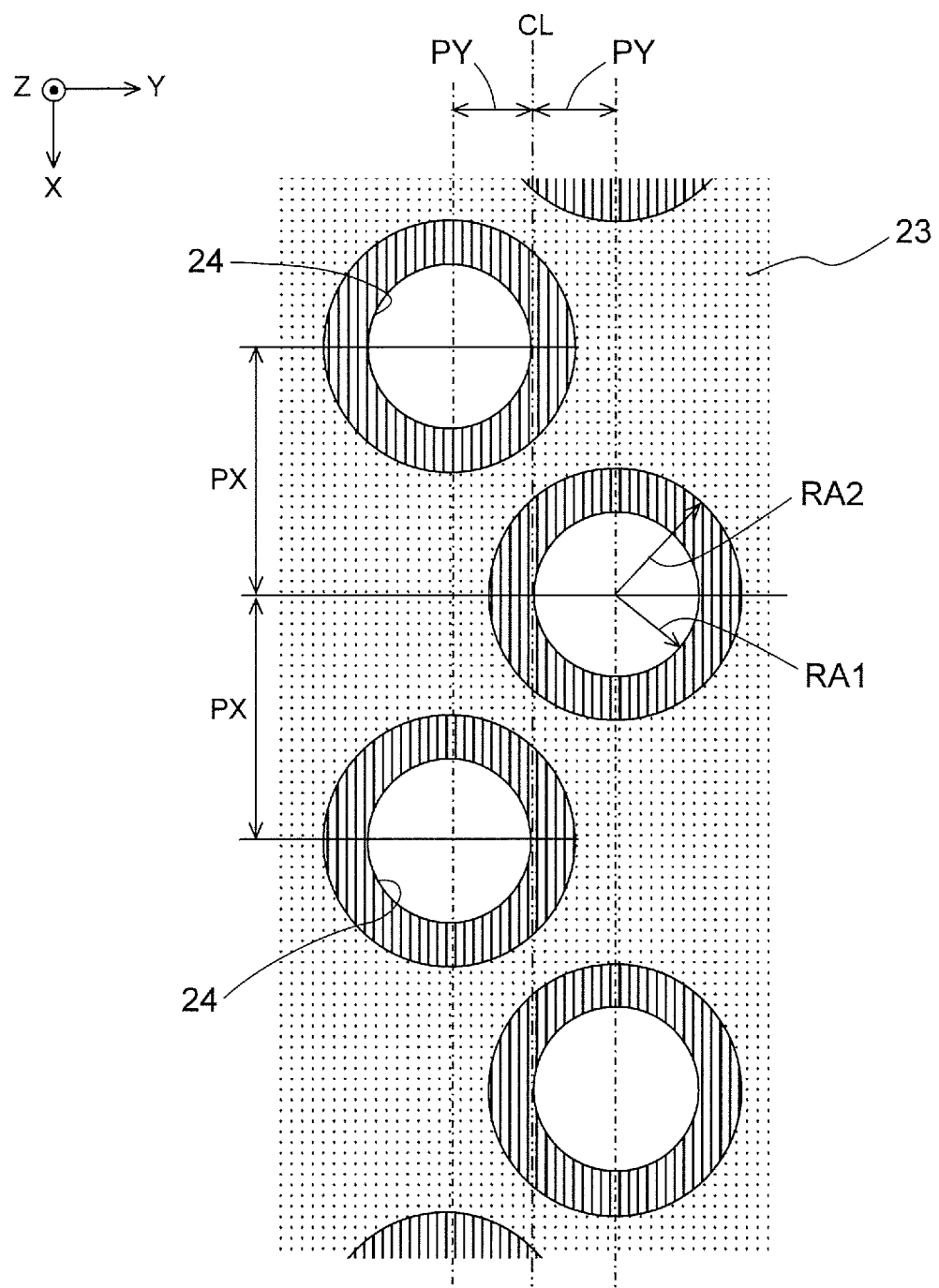
FIG. 9 is a diagram showing an array of openings of a mask in the first embodiment.

FIG. 9 is a diagram showing an array of the openings 24 of the mask 23 (second light blocking member) viewed from the +Z side. The mask 23 has a plurality of openings 24 arranged in two lines in a zigzag fashion, with each line extending in the X direction. Assuming that an interval (i.e., center-to-center distance) of adjacent openings 24 in the X direction is PX, an array interval of the openings 24 in each line in the X direction is 2×PX. Each opening 24 is in a circular shape, and an opening radius RA1 on the surface facing the LED array 30 (FIG. 3) is smaller than an opening radius RA2 on the surface facing the first lens plate 11 (FIG. 5). In other words, the opening 24 has a shape such that the opening radius gradually increases with an advance in the +Z direction.

Figure 10:
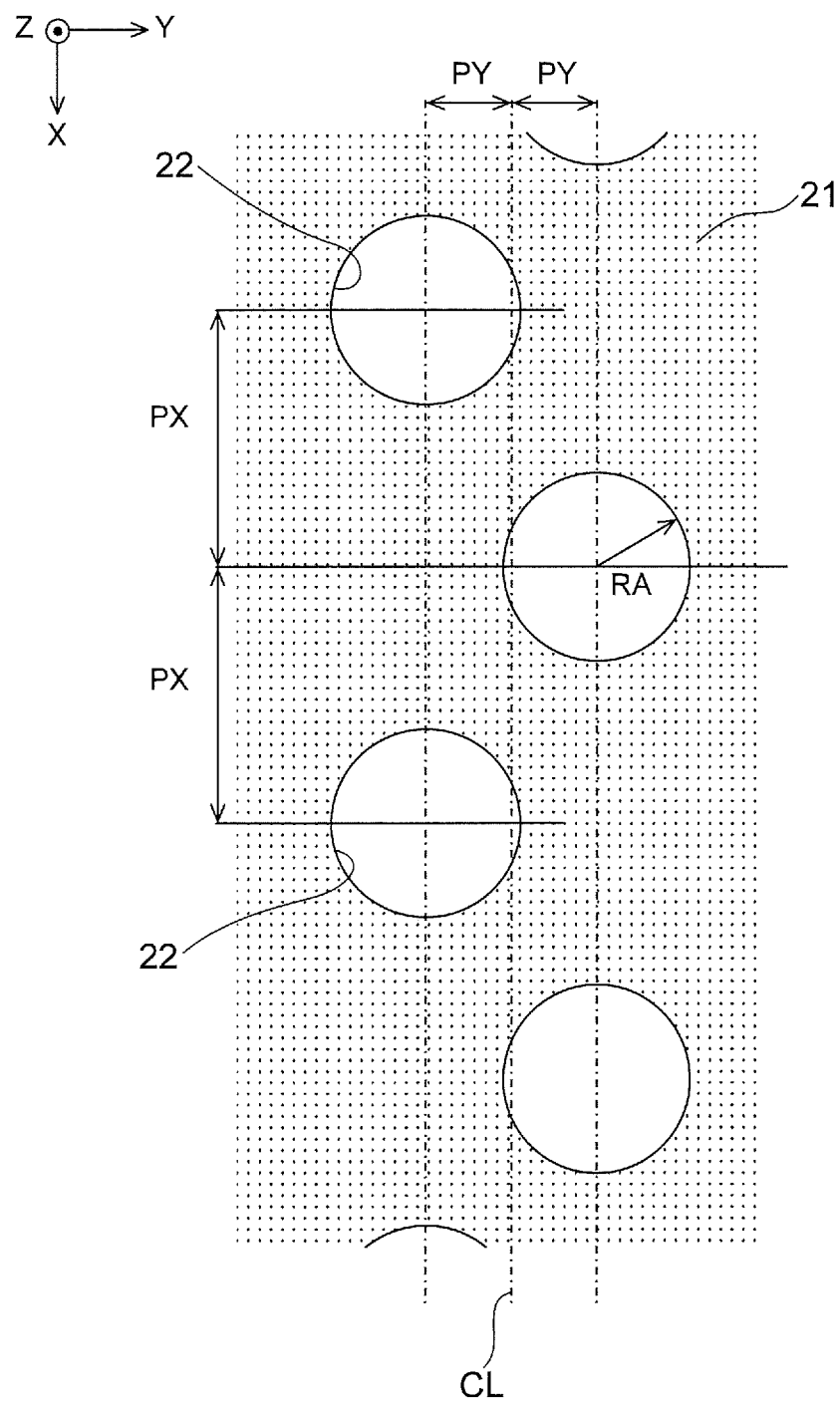
FIG. 10 is a diagram showing an array of openings of a light blocking plate in the first embodiment.

FIG. 10 is a diagram showing an array of the openings 22 of the light blocking plate 21 (i.e., the first light blocking member) viewed from the +Z side. The light blocking plate 21 has a plurality of openings 22 arranged in two lines in a zigzag fashion, with each line extending in the X direction. Assuming that an interval (i.e., a center-to-center distance) of adjacent openings 22 in the X direction is PX, an array interval of the openings 22 in each line in the X direction is 2×PX. Each opening 22 is in a circular shape and has an opening radius RA. The opening radius RA of the opening 22 is constant in the Z direction.

Figure 11:
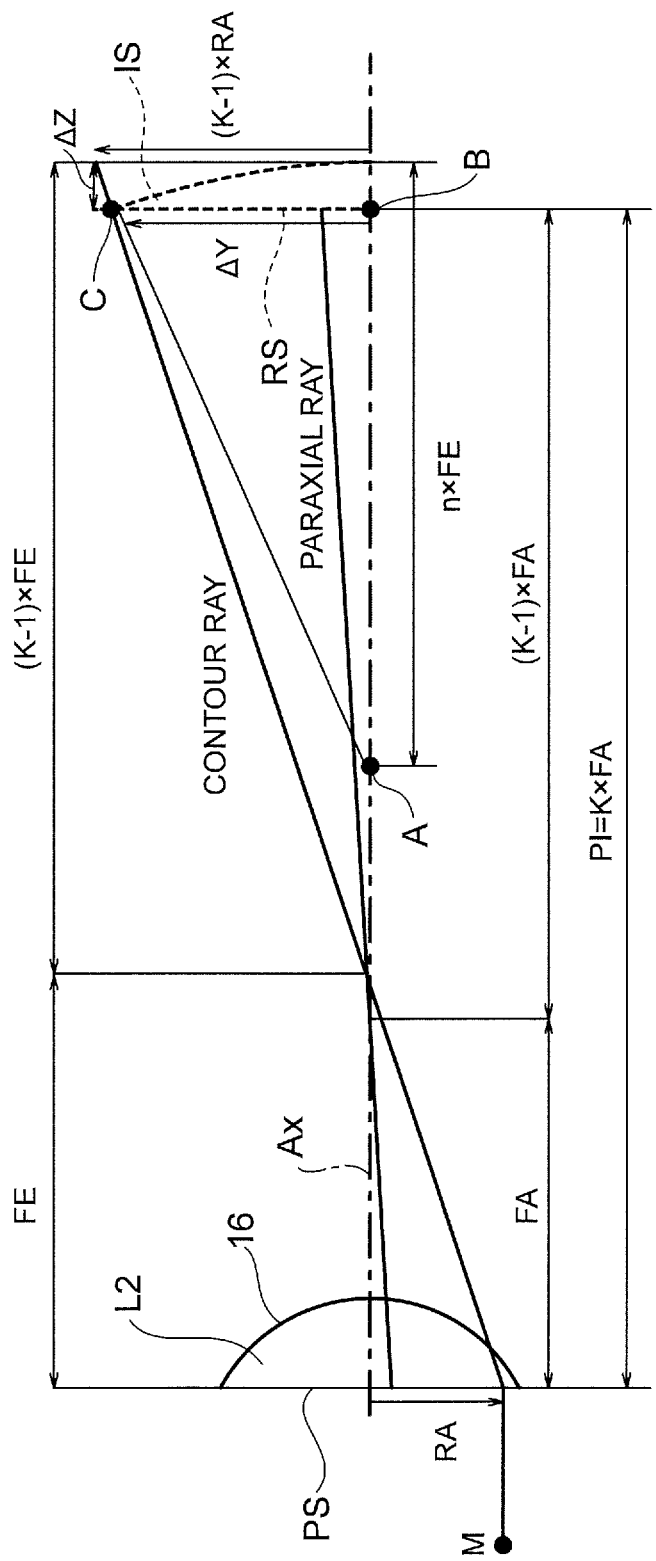
FIG. 11 is a diagram showing a function of lenses of the lens unit of the first embodiment.

Next, focal lengths and field curvatures of the lenses L1 and L2 of the lens plates 11 and 14 will be described below. FIG. 11 is a schematic diagram showing an imaging condition of light after passing through the lenses L1 and L2. Incidentally, among the surfaces of the lenses L1 and L2, only the lens surface 16 of the lens L2 is shown in FIG. 11. As mentioned earlier, the direction of the optical axis Ax is the Z direction.

A ray passing through the vicinity of the optical axis Ax of the lenses L1 and L2 will be referred to as a paraxial ray. On the other hand, a ray incident in the Z direction on a position on the lens surface 15 (not shown in FIG. 11) the farthest from the optical axis Ax (i.e., a position separate from the optical axis Ax by the opening radius RA of the opening 22) will be referred to as a contour ray. The contour ray is also referred to as an off-axis ray.

A focal length of the paraxial ray will be referred to as a paraxial focal length FA. Put another way, a focal point of the paraxial ray is situated at a position at the distance FA from a principal plane PS of the lens L2. A distance from the principal plane PS to a light receiving surface RS is assumed to be PI, and a ratio of the distance PI to the paraxial focal length FA is assumed to be K. K is an integer larger than or equal to 2. The light receiving surface RS is a plane passing through a point B and orthogonal to the optical axis Ax. The light receiving surface RS is set to coincide with the surface 41a of the photosensitive drum 41.

The magnification of the lens L2 having the lens surfaces 15 and 16 equals K−1, and the magnification of the lens L1 having the lens surfaces 12 and 13 equals 1/(K−1). For example, K=3. As is clear from FIG. 11, the imaging position B of the paraxial ray is situated at a position at a distance K×FA (e.g., 3×FA) from the principal plane PS.

A focal length of the contour ray will be referred to as a contour focal length (i.e., an off-axis focal length) FE. Put another way, a focal point of the contour ray is situated at a position at the distance FE from the principal plane PS of the lens L2. The imaging position of the contour ray is situated at a point C.

ΔZ represents the difference between a distance K×FE (e.g., 3×FE) from the principal plane PS on the optical axis Ax and the distance K×FA (e.g., 3×FA) from the principal plane PS to the point C in the Z direction. ΔZ represents magnitude of the field curvature. Here, assuming that the refractive indices of the lenses L1 and L2 are n and the focal lengths of the lenses L1 and L2 are F, according to the Petzval sum P=1/(nF), the image surface IS of the contour ray is a curved surface passing through the point C and having a curvature radius nFE (=n×FE).

In FIG. 11, a triangle connecting the points A, B and C is a right triangle. Let AB represent a length of a line segment connecting the points A and B, BC represent a length of a line segment connecting the points B and C, and AC represent a length of a line segment connecting the points A and C, the following expression (1) holds:

$$|AC|^2 = |AB|^2 + |BC|^2 \qquad (1)$$

By approximating the length BC of a side represented by BC as BC≈2×RA, the following expression (2) holds:

$$n^2FE^2 = (n\ FE - \Delta Z)^2 + (K-1)^2 RA^2 \qquad (2)$$

From the expression (2), the following expression (3) is derived as a quadratic function of ΔZ:

$$\Delta Z^2 - 2nFE\Delta Z + (K-1)^2 RA^2 = 0 \qquad (3)$$

From the expression (3), ΔZ can be represented by the following expression (4):

$$\Delta Z = n\ FE - \sqrt{n^2 FE^2 - (K-1)^2 RA^2} \qquad (4)$$

On the other hand, since the distance from the principal plane PS to the point B is K×FA, ΔZ can be represented by the following expression (5):

$$\Delta Z = K(FE - FA) \qquad (5)$$

Here, ΔF is defined as the following expression (6):

$$\Delta F = FE - FA \qquad (6)$$

Namely, ΔZ=K×ΔF holds.

The field curvature decreases the most when the positions in the Z direction of the point B and the point C are equal to each other. By defining ΔFB as the difference ΔF between the contour focal length FE and the paraxial focal length FA in such a case, the following expression (7) is obtained:

$$\Delta FB = \frac{n\ FE - \sqrt{n^2 FE^2 - (K-1)^2 RA^2}}{K} \qquad (7)$$

(Operation of Printer)

The operation of the printer 100 configured as above will be described below with reference to FIG. 1.

The control section of the printer 100 starts a print operation when a print command and print data are received from an external device. In each process unit 4Y, 4M, 4C and 4K, the surface of the photosensitive drum 41 is uniformly charged by the charging roller 42 supplied with the charging voltage. When the charged surface reaches a position facing the LED head 3 due to the rotation of the photosensitive drum 41, the exposure by the LED head 3 is carried out and an electrostatic latent image is formed on the surface of the photosensitive drum 41. The electrostatic latent image is developed by the development device 40, by which a toner image is formed on the surface of the photosensitive drum 41.

On the other hand, a sheet P stored in the sheet feed cassette 60 is extracted from the sheet feed cassette 60 by the sheet feed roller 61 and is conveyed by the conveyance roller pairs 62 and 63 to the transfer unit 8. In the transfer unit 8, the transfer belt 81 travels due to the rotation of the drive roller 82 and holds the sheet P to convey it along the process units 4Y, 4M, 4C and 4K.

When the toner image on the surface of the photosensitive drum 41 reaches the vicinity of the transfer roller 80 due to the rotation of the photosensitive drum 41, the transfer voltage is applied to the transfer roller 80 and therefore the toner image on the surface of the photosensitive drum 41 is transferred to the sheet P on the transfer belt 81. Namely, the toner images of the colors formed on the photosensitive drums 41 of the process units 4Y, 4M, 4C and 4K are successively transferred to the sheet P on the transfer belt 81.

Subsequently, the sheet P to which the toner images of the colors have been transferred is conveyed to the fixation unit 5 due to the traveling of the transfer belt 81. The fixation roller 51 and the pressure roller 52 of the fixation unit 5 fuse the toner images on the sheet P by means of pressing and heating to fix the toner images on the sheet P. The sheet P with the toner images fixed thereon is ejected by the ejection roller pairs 71 and 72 and is set on the stacker part 73. With the above process, the print operation by the printer 100 (i.e., operation of image formation) is finished.

Next, the operation of the LED head 3 will be described below with reference to FIG. 3 and FIG. 7. A light beam emitted from an LED element 32 of the LED array 30 is incident on the lens surface 12 of the first lens plate 11 of the lens unit 1, passes through the lens surfaces 12, 13, 15 and 16 of the lens plates 11 and 14, and is condensed on the surface 41a of the photosensitive drum 41.

As shown in FIG. 7, a light beam emitted from an LED element 32 in the vicinity of the optical axis of a lens surface 12 reaches the surface 41a of the photosensitive drum 41 via the paths R1, R2, R3, etc. A light beam emitted from an LED element 32 separate from the optical axis reaches the surface 41a of the photosensitive drum 41 via the path R4 shown in FIG. 7, for example.

The light beams emitted from the LED array 30 pass through the lens surfaces 12 and 13, thereby forming a reduced inverted image (i.e., intermediate image) of the LED array 30 at a substantially intermediate position between the lens surfaces 13 and the lens surfaces 15, and further pass through the lens surfaces 15 and 16, thereby forming an enlarged inverted image of the reduced inverted image (i.e., image formation) at the imaging position. Namely, an upright isometric image 70 of the LED array 30 is formed at the imaging position by the lens unit 1.

(Field Curvature Reduction Effect)

Figure 12:
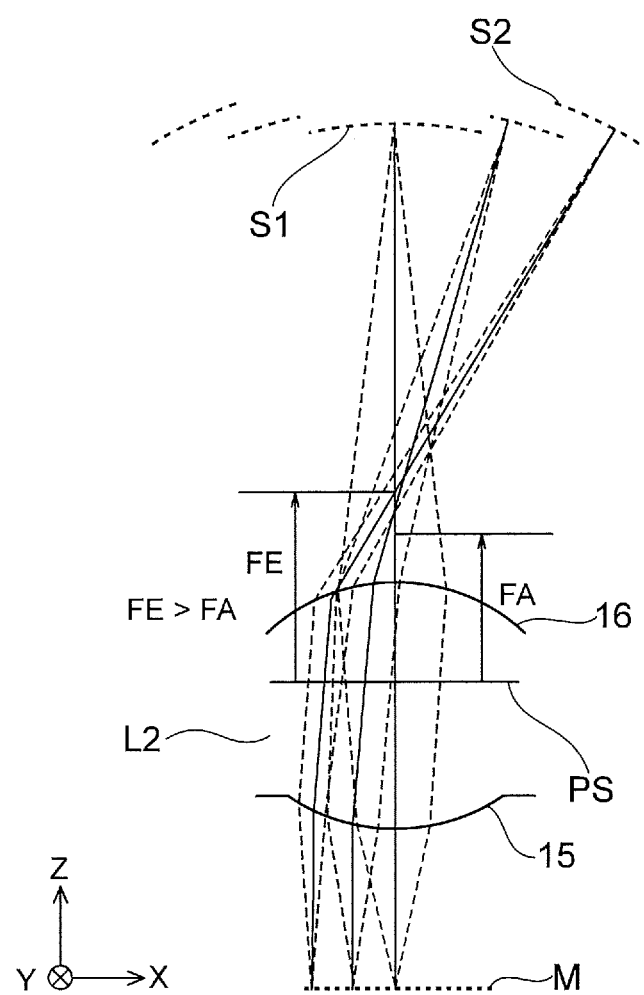
FIG. 12 is a diagram showing field curvature of a lens of the lens unit of the first embodiment.

Next, reduction in the field curvature by the lens unit 1 of the first embodiment will be described below with reference to FIG. 12. FIG. 12 is a schematic diagram showing the field curvature in the lens unit 1 of the first embodiment. Each lens L1 and L2 of the lens plates 11 and 14 in the first embodiment is an aspherical lens and its contour focal length FE is longer than its paraxial focal length FA (i.e., FA<FE). Further, in each lens L1 and L2, a region between an incident region of the paraxial ray and an incident region of the contour ray is smoothly continuous and the focal length F of a ray incident on this region satisfies FA<F<FE.

The distance from the lens L2 to the image surface formed by the lenses L1 and L2 is proportional to the focal length. Thus, according to the aforementioned relationship FA<FE, the image surface S2 of the contour ray and its vicinal rays is more separate from the lens L2 in the Z direction (optical axis direction) than the image surface S1 of the paraxial ray. However, the image surface S2 of the contour ray and its vicinal rays approaches the lens L2 in the Z direction by a distance corresponding to the field curvature. As a result, the Z direction distance from the lens L2 to the imaging position (i.e., the image surface S2) of the contour ray and the Z direction distance from the lens L2 to the imaging position (i.e., the image surface S1) of the paraxial ray become substantially equal to each other. Accordingly, the image surface formed by the lens unit 1 becomes similar in shape to a flat surface due to the reduction in the field curvature.

Figure 13:
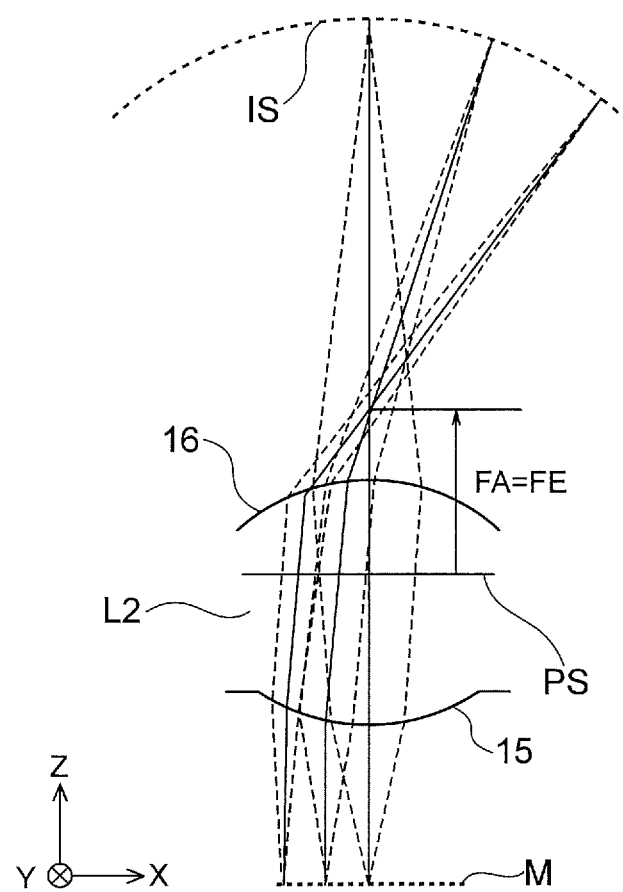
FIG. 13 is a diagram showing field curvature of a lens in a comparative example.

FIG. 13 is a schematic diagram showing the field curvature in a lens unit as a comparative example. For convenience of description, components of the lens unit of the comparative example will be described with the same reference characters as the components of the lens unit 1 of the first embodiment. In regard to the lens L2 of the lens unit of the comparative example, the paraxial focal length FA and the contour focal length FE are equal to each other (i.e., FE=FA). Each lens surface 15 and 16 of the lens L2 is a convex surface. In this comparative example, there occurs field curvature convex toward the image formation side such that the image surface IS approaches the lens L2 in the Z direction with the increase in the distance from the optical axis Ax.

Figure 14A:
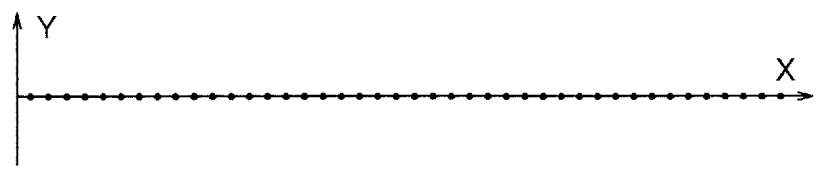
FIGS. 14A and 14B are schematic diagrams for explaining images of LED elements formed by the lens unit of the first embodiment.
Figure 14B:
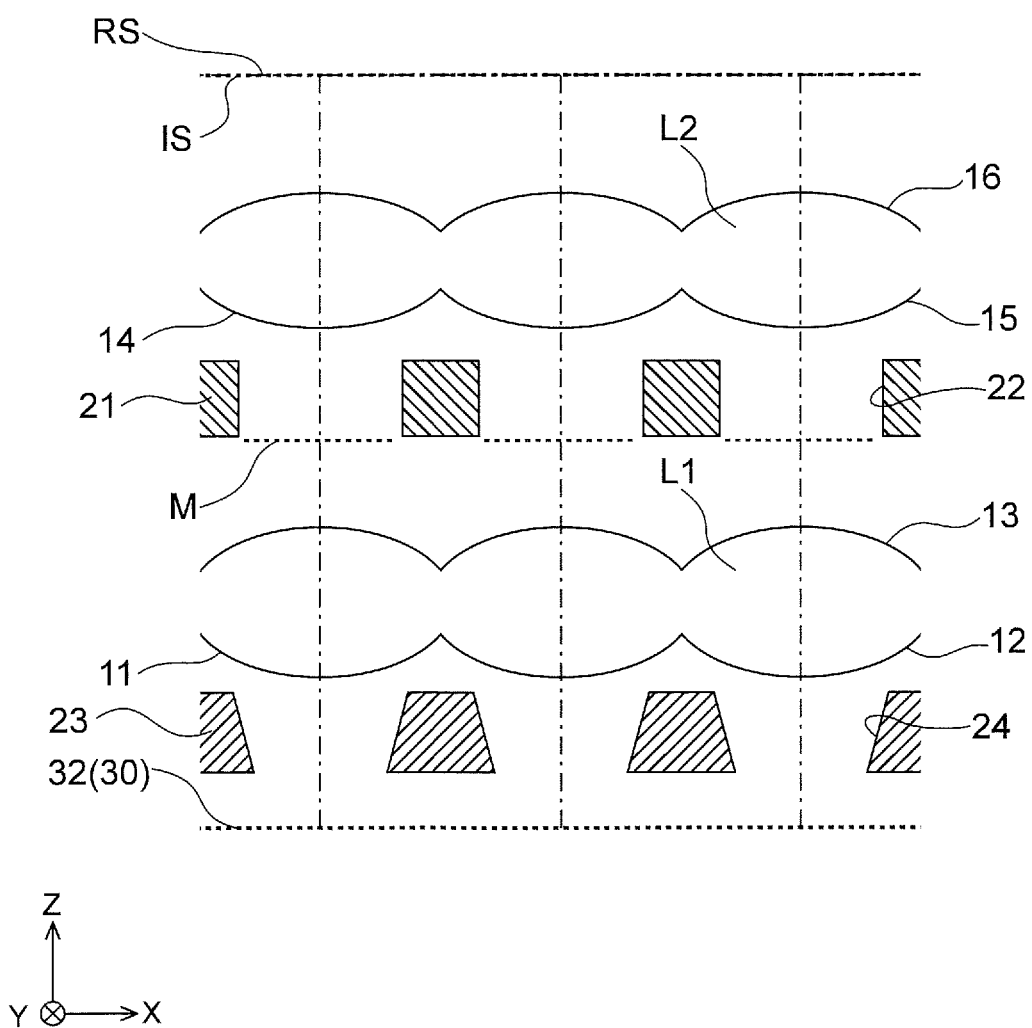

FIG. 14A is a schematic diagram showing images of the LED elements 32 formed by the lens unit 1 of the first embodiment. The horizontal axis represents the position in the X direction and the vertical axis represents the position in the Y direction. FIG. 14B is a schematic diagram for explaining the formation of the images by the lens unit 1 of the first embodiment.

As shown in FIG. 14B, in the lens unit 1 of the first embodiment, the image surface M of the intermediate image formed between the lens plates 11 and 14 is a substantially flat surface due to the reduction in the field curvature since the lens L1 of the first lens plate 11 has the configuration such that the contour focal length FE is longer than the paraxial focal length FA. Further, since the lens L2 of the second lens plate 14 has the configuration such that the contour focal length FE is longer than the paraxial focal length FA, the image surface IS of the image of the LED element 32 is also a substantially flat surface due to the reduction in the field curvature.

Consequently, as shown in FIG. 14A, light beam spots as the images of the LED elements 32 on the light receiving surface RS become small, and accordingly, light beam spots of substantially constant size are arranged in the X direction. Thus, the occurrence of vertical stripes in the printed image can be inhibited by equipping the printer 100 with the LED head 3 including the lens unit 1.

Figure 15A:
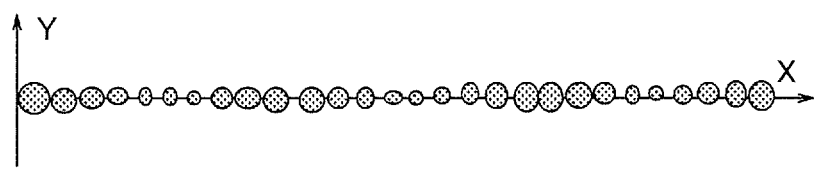
FIGS. 15A and 15B are schematic diagrams for explaining images of LED elements formed by the lens unit of the comparative example.
Figure 15B:
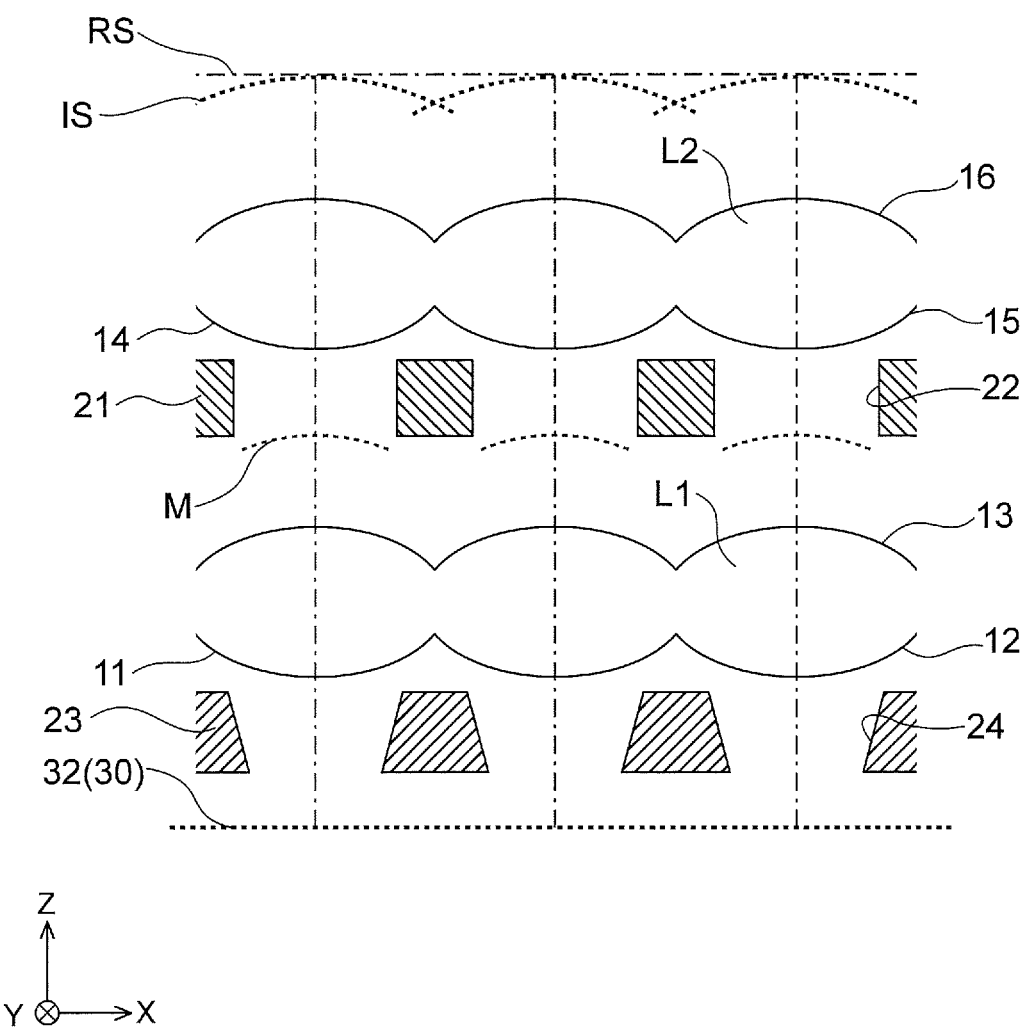

FIG. 15A is a schematic diagram showing images of the LED elements 32 formed by the lens unit of the comparative example. The horizontal axis represents the position in the X direction and the vertical axis represents the position in the Y direction. FIG. 15B is a schematic diagram for explaining the formation of the images by the lens unit of the comparative example.

The paraxial focal length FA and the contour focal length FE are equal to each other in each lens L1 and L2 of the lens unit of the comparative example. Thus, the image surface M of the intermediate image is a curved surface convex toward the image formation side and the image surface IS of the image of the LED element 32 is also a curved surface convex toward the image formation side.

Therefore, light beam spots as the images of the LED elements 32 on the light receiving surface RS become small due to condensation at positions corresponding to the optical axes Ax of the lenses L1 and L2, while blurring and becoming large at positions corresponding to boundaries of lenses adjacent to each other in the X direction. As a result, the beam diameter of the light beam spot varies in the X direction at intervals (cycles) equal to the array interval of the lenses. Accordingly, vertical stripes at intervals equal to the array interval of the lenses occur in the printed image.

Next, a concrete example of numerical values in the first embodiment will be described below in contrast with the comparative example. Table 1 shows dimensions of parts of the lens array of the first embodiment and the lens array of the comparative example. The dimensions of parts shown in Table 1 are common to the lens array of the first embodiment and the lens array of the comparative example. In Table 1, each radius RL is a radius of the lens in a plane orthogonal to the optical axis (Z direction), and is different from the curvature radius of the lens surface.

TABLE 1

| Optical Element | Part | Item | Dimension (mm) |
|---|---|---|---|
| First Lens Plate 11 | — | Thickness LT | 1.3 |
| | — | Surface Interval LG | 2.2 |
| | Lens Surfaces 12 and 13 | Array Interval PX | 1.2 |
| | | Array Interval PY | 0.18 |
| | Lens Surface 12 | Radius RL | 0.75 |
| | Lens Surface 13 | Radius RL | 0.6 |
| Second Lens Plate 14 | — | Thickness LT | 0.6 |
| | Lens Surfaces 15 and 16 | Array Interval PX | 1.2 |
| | | Array Interval PY | 0.18 |
| | Lens Surface 15 | Radius RL | 0.6 |
| | Lens Surface 16 | Radius RL | 0.75 |
| Mask 23 | — | Thickness MT | 1.0 |
| | — | Surface Interval LFM | 1.9 |
| | Opening 24 | Opening Radius RA1 | 0.35 |
| | | Opening Radius RA2 | 0.6 |
| Light Blocking Plate 21 | — | Thickness ST | 1.0 |
| | — | Surface Interval LFS | 1.1 |
| | Opening 22 | Opening Radius RA | 0.48 |

Table 2 shows the shape of each lens surface of the lens arrays of the first embodiment and each lens surface of the lens arrays of the comparative example. In both of the first embodiment and the comparative example, each lens surface 12, 13, 15 and 16 is in a rotational aspherical shape and is represented by a curvature radius and aspherical surface coefficients of the fourth, sixth and eighth orders.

TABLE 2

| Lens Surface | Item | First Embodiment (mm) | Comparative Example (mm) |
|---|---|---|---|
| Lens Surface 12 | Curvature Radius | 0.957055 | 1.00615 |
| | Aspherical Surface Coefficient-Fourth Order | −0.292414 | −0.443394 |
| | Aspherical Surface Coefficient-Sixth Order | 0.0540926 | 0.679677 |
| | Aspherical Surface Coefficient-Eighth Order | −0.0116168 | −0.996916 |
| Lens Surface 13 | Curvature Radius | 0.892549 | 0.857508 |
| | Aspherical Surface Coefficient-Fourth Order | −0.562752 | −0.241515 |
| | Aspherical Surface Coefficient-Sixth Order | 0.559558 | −0.688147 |
| | Aspherical Surface Coefficient-Eighth Order | −1.11204 | 0.582512 |

Incidentally, in both of the first embodiment and the comparative example, the lens surface 16 has the same shape as the lens surface 12, namely, a shape obtained by rotating the lens surface 12 by 180 degrees around a rotation axis in the Y direction. The lens surface 15 has the same shape as the lens surface 13, namely, a shape obtained by rotating the lens surface 13 by 180 degrees around a rotation axis in the Y direction. On the lens plates 11 and 14, the lens surfaces 12, 13, 15 and 16 are respectively arrayed in the X direction for a distance of 212 mm.

The lens plates 11 and 14 are formed of cycloolefin resin "ZEONEX E48R" produced by Zeon Corporation. ZEONEX is a registered trademark of Zeon Corporation. The refractive index of this material for light at a wavelength of 770 nm (light emitted from the LED element 32) is 1.5247.

The light blocking plate 21 and the mask 23 are formed of polycarbonate resin "Iupilon H-4000" produced by Mitsubishi Engineering-Plastics Corporation. Iupilon is a registered trademark of Mitsubishi Engineering-Plastics Corporation.

Table 3 shows the paraxial focal length FA, the contour focal length (i.e., off-axis focal length) FE and their difference ΔF (=FA−FE) in the first embodiment and the comparative example.

TABLE 3

| Item | First Embodiment (mm) | Comparative Example (mm) |
|---|---|---|
| Paraxial Focal Length FA | 1.146 | 1.146 |
| Contour Focal Length FE | 1.244 | 1.146 |
| Difference ΔF (= FA − FE) | 0.097 | 0 |

As shown in Table 3, in the lens unit of the first embodiment, the difference ΔF between the paraxial focal length FA and the contour focal length FE is 0.097 mm. In contrast, the difference ΔF between the paraxial focal length FA and the contour focal length FE is 0 in the lens unit of the comparative example.

Figure 16:
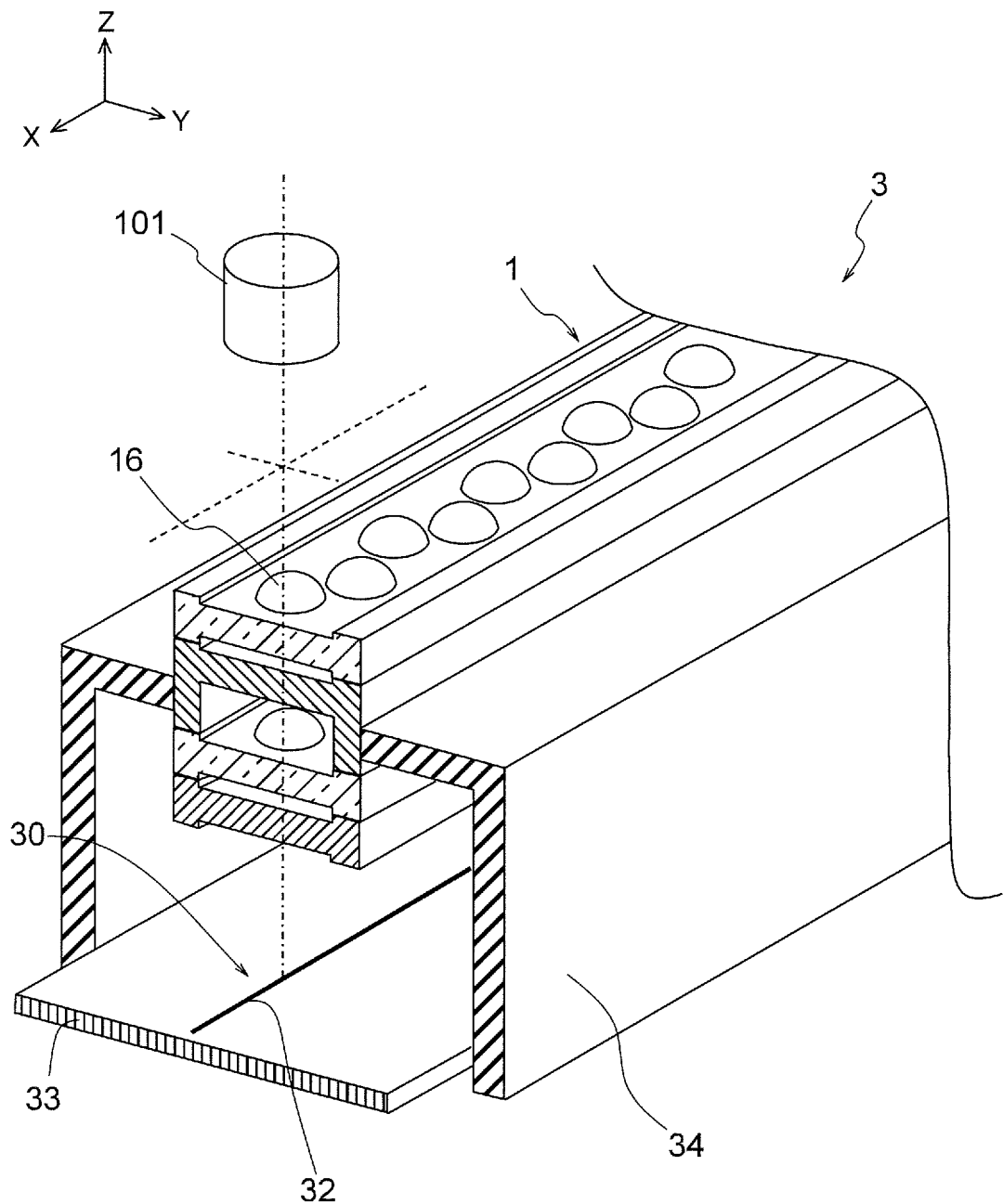
FIG. 16 is a perspective view for explaining a method for measuring a light amount of the LED head by using an optical image measuring instrument.
Figure 17:
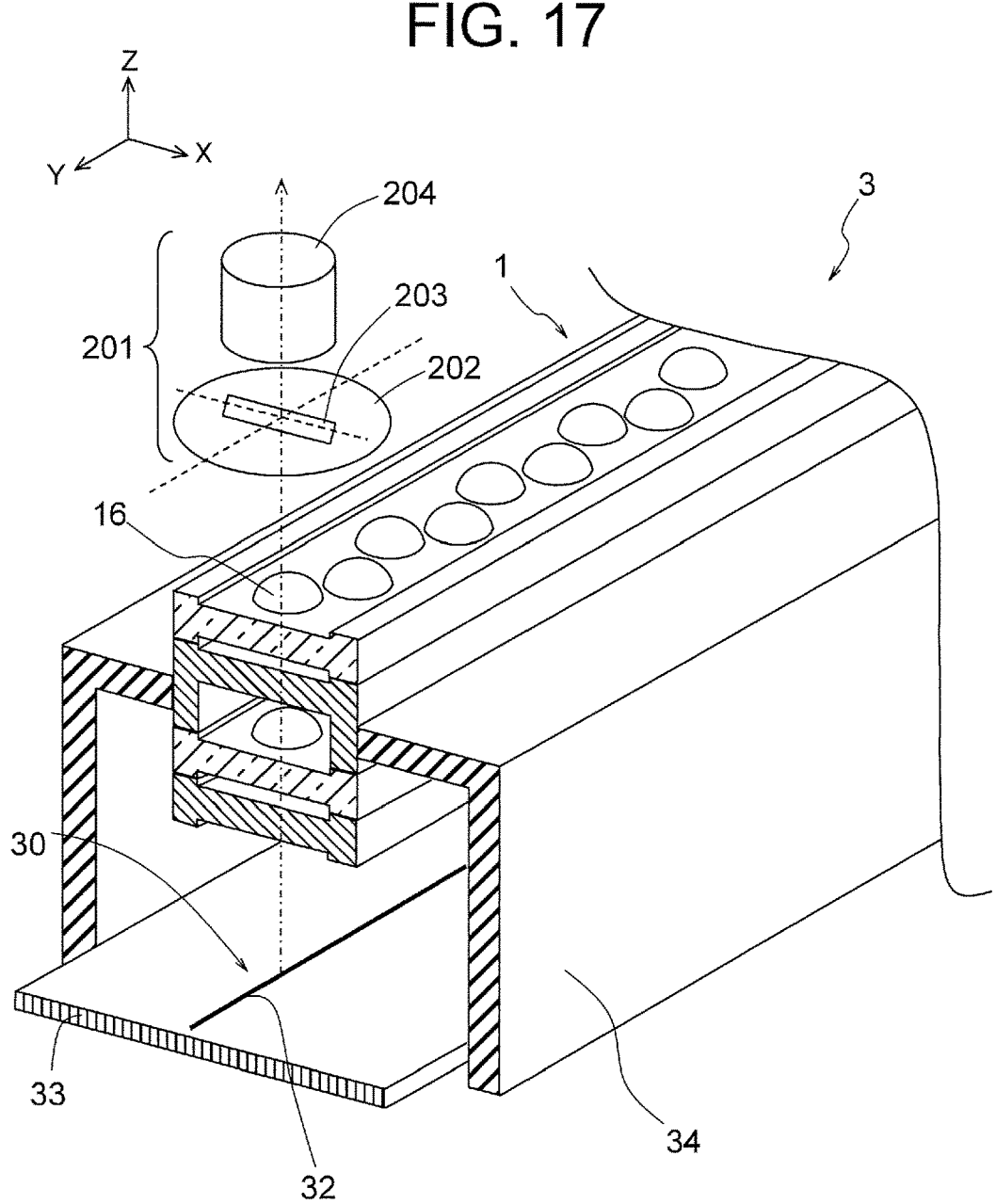
FIG. 17 is a perspective view for explaining a method for measuring a slit waveform of the LED head by using the optical image measuring instrument.

Next, a method for measuring the beam diameter of the LED head 3 will be described below with reference to FIG. 16 and FIG. 17. In this example, the beam diameter is measured based on a slit waveform after making light amount correction of each LED element 32. FIG. 16 is a schematic diagram for explaining a method for measuring the light amount of the LED head 3. FIG. 17 is a schematic diagram for explaining a method for measuring the slit waveform of the LED head 3.

An optical image measuring instrument is used for the measurement of the light amount and the slit waveform of the light beams emitted from the LED head 3. The optical image measuring instrument includes a photosensor 101 (FIG. 16) used for the light amount measurement of the LED head 3 and a slit sensor 201 (FIG. 17) used for the slit waveform measurement.

In FIG. 16, the photosensor 101 of the optical image measuring instrument measures the light amount at a position separate from the lens surface 16 of the LED head 3 by the distance LI in regard to each LED element 32. For the measurement, the photosensor 101 is movable in the X direction. The LED elements 32 of the LED head 3 are successively energized to emit light, while the photosensor 101 is moved successively to each position corresponding to the LED element 32 emitting light to receive the light and measure the light amount of the received light.

In FIG. 17, the slit sensor 201 of the optical image measuring instrument includes a photosensor 204 and a light blocking plate 202 having a slit 203. While the direction of the slit 203 of the light blocking plate 202 can be switched between the Y direction (i.e., a direction at 90 degrees with respect to the X direction) and a direction at 45 degrees with respect to the X direction, the light blocking plate 202 in this example is used with the slit 203 oriented in the Y direction (i.e., the direction at 90 degrees with respect to the X direction). The photosensor 204 receives a light beam that passed through the slit 203 and transduces the light beam into an electric signal.

The slit sensor 201 is movable in the X direction. The LED elements 32 of the LED head 3 are successively energized to emit light, while the slit sensor 201 is moved successively to each position corresponding to the LED element 32 emitting light to receive the light via the slit 203 and measure the slit waveform (i.e., image formation waveform).

The light amount correction and the beam diameter measurement by use of the optical image measuring instrument will be explained below. First, the light amount correction of the LED elements 32 of the LED head 3 is carried out. Specifically, by using the optical image measuring instrument having the photosensor 101 shown in FIG. 16, the light amount of each LED element 32 (each dot) is measured with the photosensor 101 while successively energizing the LED elements 32 of the LED head 3 one by one at the same electric current value to emit light.

Then, based on the measured light amount values of all the LED elements 32, an electric current value (light amount correction value) for each LED element 32 that makes the light amounts of all the LED elements 32 equal to each other is calculated.

Subsequently, the measurement of the beam diameter is carried out for all the LED elements 32. By using the optical image measuring instrument having the slit sensor 201 shown in FIG. 17, the image formation waveform of each LED element 32 is measured with the slit sensor 201 while successively energizing the LED elements 32 of the LED head 3 one by one at the light amount correction value to emit light.

Figure 18:
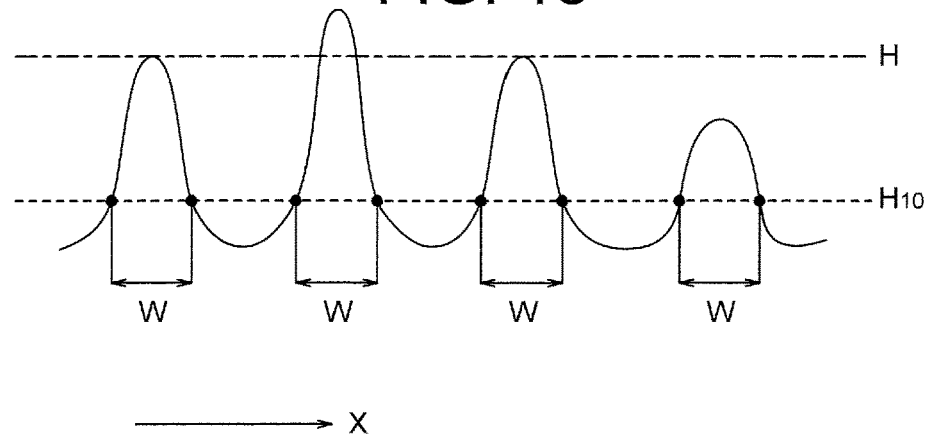
FIG. 18 is a schematic diagram showing an example of the slit waveform measured with the optical image measuring instrument.

FIG. 18 is a diagram showing an example of the slit waveform measured with the slit sensor 201. An average value H of peaks of the measured slit waveforms of all the LED elements 32 is calculated, and the width W of each slit waveform at a 10% height $H_{10}$ of the peak average value H is determined as the beam diameter.

Figure 19:
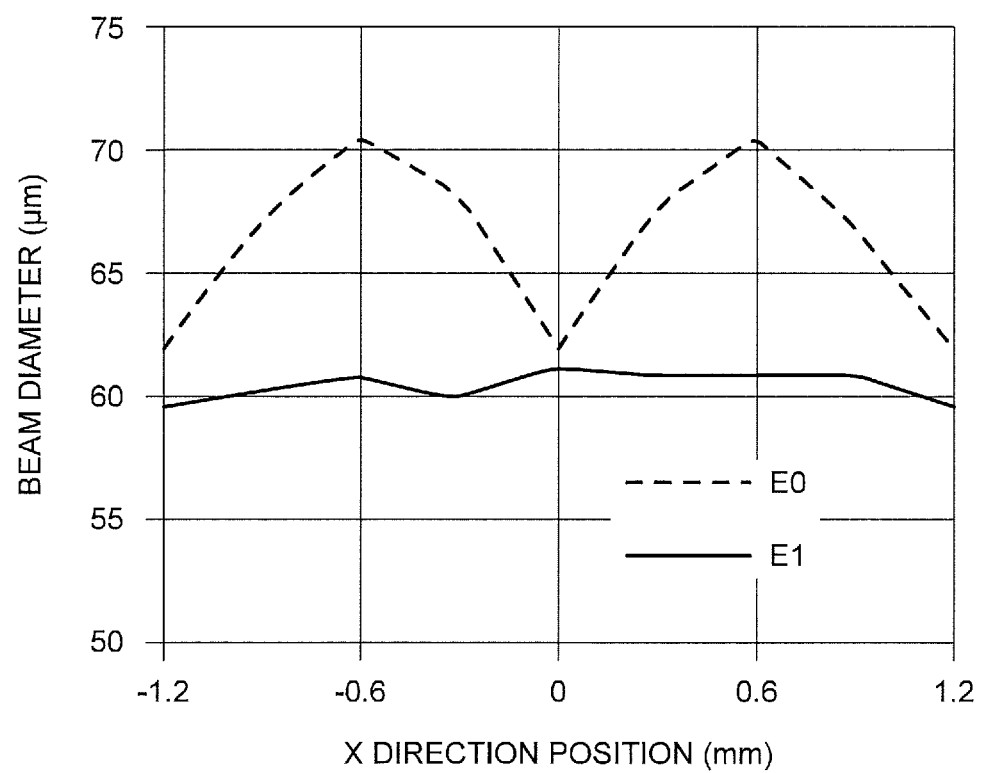
FIG. 19 shows graphs indicating variations in beam diameters in the lens unit of the first embodiment and in the lens unit of the comparative example.

FIG. 19 shows graphs indicating a measurement result of the beam diameter of each LED element 32 in the first embodiment and a measurement result of the beam diameter of each LED element 32 in the comparative example. The horizontal axis represents a position X (mm) in the X direction (i.e., an X direction position) and the vertical axis represents the beam diameter (μm) at the position X. The measurement range in the X direction (−1.2 mm to +1.2 mm) corresponds to twice the array interval of the lens surfaces 12, 13, 15 and 16 in the X direction (PX=1.2 mm).

In FIG. 19, the measurement result of the LED head 3 of the first embodiment is indicated by a solid line (reference character E1), while the measurement result of the LED head of the comparative example is indicated by a broken line (reference character E0).

As shown in FIG. 19, the difference between the maximum value and the minimum value of the beam diameter in the LED head of the comparative example is approximately 10.0 μm, whereas the difference between the maximum value and the minimum value of the beam diameter in the LED head 3 of the first embodiment is approximately 2.4 μm. To sum up, in the LED head 3 of the first embodiment, the variation in (variation width of) the beam diameter is reduced significantly in comparison with the LED head of the comparative example.

Next, a description will be given of a print test conducted by equipping the printer 100 (FIG. 1) with the LED head 3 of the first embodiment and the LED head of the comparative example. In these LED heads, the resolution is 1200 dpi and the length of the LED array 30 is 208 mm (corresponding to A4 size).

Figure 20A:
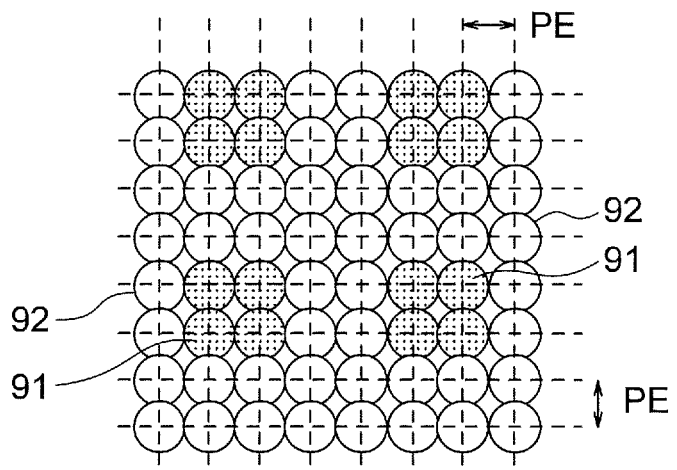
FIGS. 20A to 20C are diagrams showing print patterns printed on sheets in a print test.
Figure 20B:
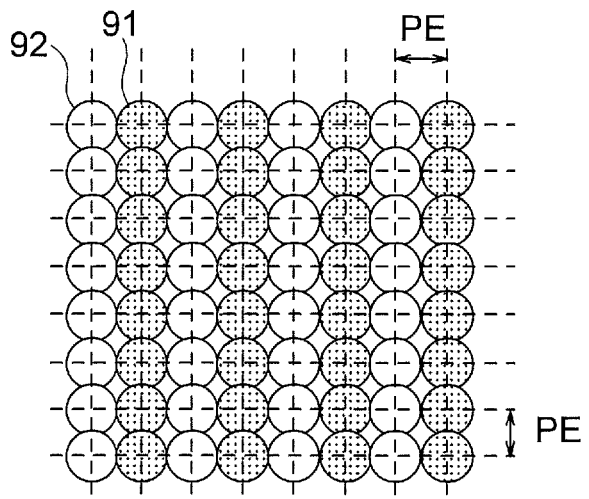
Figure 20C:
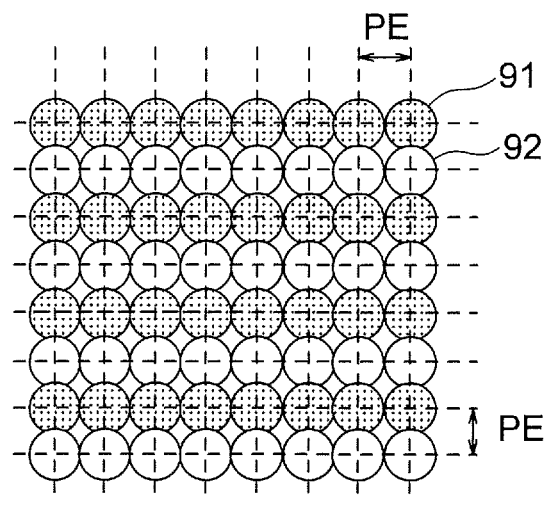

FIGS. 20A, 20B and 20C are diagrams showing print patterns printed on sheets P in the print test. In FIGS. 20A to 20C, the reference character 91 represents dots formed by the lighting of LED elements 32 (indicated by dot hatching instead of filled circles for the convenience of illustration), while the reference character 92 represents white parts (blank parts) formed by the extinction of LED elements 32.

FIG. 20A shows a print pattern printed by lighting up (i.e., energizing for light emission) pairs of adjacent LED elements 32, alternately selected in the X direction, twice consecutively and extinguishing the selected pairs of adjacent LED elements 32 twice consecutively. FIG. 20B shows a print pattern obtained by printing a thin vertical line extending in the Y direction (i.e., a conveyance direction of the sheet P) every other dot in the X direction. FIG. 20C shows a print pattern obtained by printing a thin horizontal line extending in the X direction every other dot in the Y direction.

The print patterns shown in FIGS. 20A to 20C were printed by equipping the printer 100 with the LED head 3 of the first embodiment and with the LED head of the comparative example. The images after the printing were visually observed and checked, in which images with no vertical stripes or density unevenness were judged to be excellent and images in which a vertical stripe or density unevenness was observed were judged to be defective.

Consequently, excellent print results were obtained in the cases of printing with the printer 100 equipped with the LED head 3 of the first embodiment, whereas vertical stripes at intervals equal to the array interval PX (e.g., 1.2 mm) of the lens surfaces 12, 13, 15 and 16 occurred in the cases of printing with the printer 100 equipped with the LED head of the comparative example.

From these results, it was confirmed that the occurrence of vertical stripes in the printed image can be inhibited through the reduction of the variation in the beam diameter in the LED head 3 of the first embodiment.

(Effect of First Embodiment)

As described above, the lens plates 11 and 14 in the first embodiment include the lenses L1 and L2 such that the contour focal length FE as the focal length of a ray incident on a position separate from the optical axis Ax is longer than the paraxial focal length FA as the focal length of a ray incident on the vicinity of the optical axis Ax, by which the distance from the lens to the imaging position of the contour ray and the distance from the lens to the imaging position of the paraxial ray become substantially equal to each other in the optical axis direction (i.e., Z direction). Accordingly, the image surface becomes similar in shape to a flat surface and the variation in the beam diameter can be reduced. Consequently, the occurrence of vertical stripes in the printed image can be inhibited.

Further, since each lens L1 and L2 of the lens plates 11 and 14 is an aspherical lens, the aforementioned configuration in which the contour focal length FE is longer than the paraxial focal length FA can be implemented with ease.

Furthermore, since the distance LO from the object to the first lens plate 11 and the distance LI from the second lens plate 14 to the image formation surface are substantially equal to each other and an upright isometric image of the object is formed on the image formation surface, the beam diameter on the image formation surface can be reduced and the effect of inhibiting the occurrence of vertical stripes can be enhanced.

Second Embodiment

Next, a second embodiment of the present invention will be described below. The second embodiment specifies ranges of the paraxial focal length FA and the contour focal length FE of the LED head 3 described in the first embodiment.

In the second embodiment, the surface shapes (the curvature radii and the aspherical surface coefficients) of the lens surfaces 12 and 13 of the first lens plate 11 and the lens surfaces 15 and 16 of the second lens plate 14 differ from those in the first embodiment.

Table 4 shows the shapes of the lens surfaces in two configuration examples (referred to as a configuration example 2-1 and a configuration example 2-2) of the lens unit 1 of the second embodiment.

TABLE 4

| Lens Surface | Item | Configuration Example 2-1 (mm) | Configuration Example 2-2 (mm) |
|---|---|---|---|
| Lens Surface 12 | Curvature Radius | 0.967015 | 0.922096 |
| | Aspherical Surface Coefficient- Fourth Order | −0.349871 | −0.220671 |
| | Aspherical Surface Coefficient- Sixth Order | 0.569108 | −0.0889115 |
| | Aspherical Surface Coefficient- Eighth Order | −0.907441 | 0.0711971 |
| Lens Surface 13 | Curvature Radius | 0.901353 | 0.924206 |
| | Aspherical Surface Coefficient- Fourth Order | −0.350581 | −0.839563 |
| | Aspherical Surface Coefficient- Sixth Order | −0.49054 | 1.56501 |
| | Aspherical Surface Coefficient- Eighth Order | 0.456641 | −2.53553 |

Incidentally, as mentioned in the first embodiment, the lens surface 16 has the same shape as the lens surface 12, namely, a shape obtained by rotating the lens surface 12 by 180 degrees around a rotation axis in the Y direction. The lens surface 15 has the same shape as the lens surface 13, namely, a shape obtained by rotating the lens surface 13 by 180 degrees around a rotation axis in the Y direction.

Table 5 shows the paraxial focal length FA and the contour focal length (i.e., off-axis focal length) FE in the lens units of the second embodiment (configuration examples 2-1 and 2-2).

TABLE 5

| Item | Configuration Example 2-1 (mm) | Configuration Example 2-2 (mm) | First Embodiment (mm) | Comparative Example (mm) |
|---|---|---|---|---|
| Paraxial Focal Length FA | 1.154 | 1.148 | 1.146 | 1.146 |
| Contour Focal Length FE | 1.194 | 1.306 | 1.244 | 1.146 |
| ΔF | 0.040 | 0.159 | 0.098 | 0 |
| ΔFB | 0.089 | 0.089 | 0.089 | 0.089 |
| ΔF/ΔFB | 0.45 | 1.79 | 1.10 | 0 |

Table 5 further shows the difference ΔF between the paraxial focal length FA and the contour focal length FE, ΔFB obtained from the expression (1) described in the first embodiment, and their ratio ΔF/ΔFB. Further, the paraxial focal length FA, the contour focal length FE, the difference ΔF, ΔFB and ΔF/ΔFB in the lens unit of the first embodiment and in the lens unit of the comparative example described earlier are also shown.

As shown in Table 5, in the first embodiment and the configuration examples 2-1 and 2-2 of the second embodiment, ΔF is within a range of 0.040 to 0.159 and ΔF/ΔFB is within a range of 0.45 to 1.79. In contrast, in the comparative example, ΔF and ΔF/ΔFB are both 0 and not included in the ranges of the second embodiment.

Figure 21:
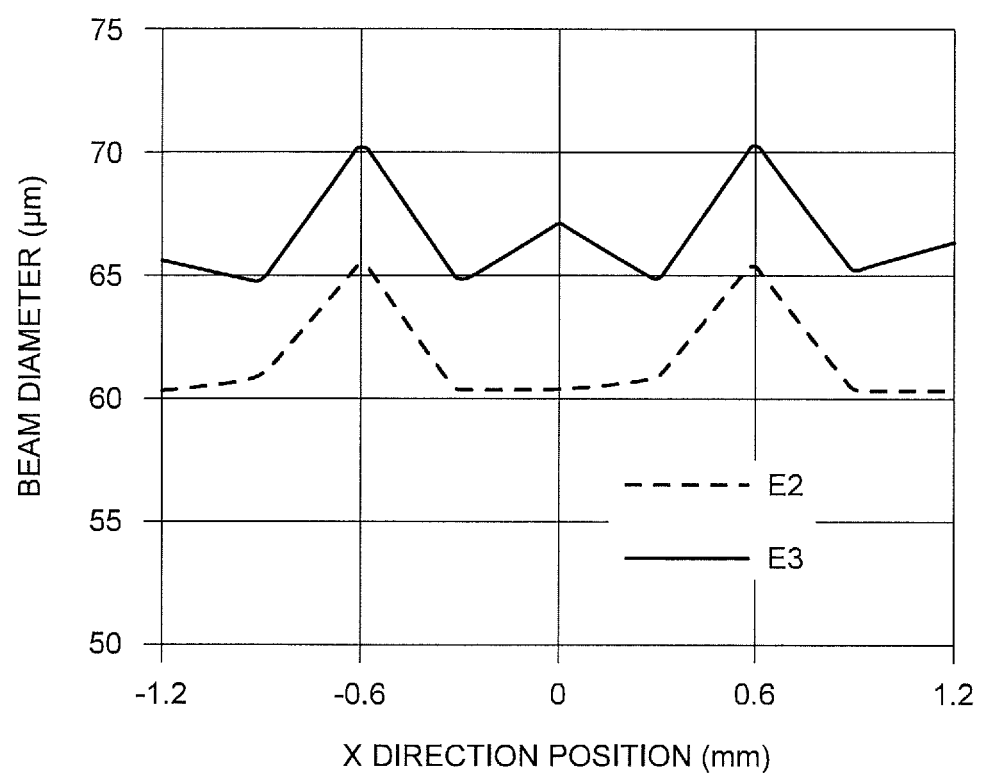
FIG. 21 shows graphs indicating variations in beam diameters in lens units in configuration examples 2-1 and 2-2 in a second embodiment.

FIG. 21 is a graph showing the measurement result of the beam diameter of each LED element 32 in the LED heads 3 in the configuration examples 2-1 and 2-2 of the second embodiment. The horizontal axis represents the position X (mm) in the X direction and the vertical axis represents the beam diameter (μm) at the position X. The measurement range in the X direction (−1.2 mm to +1.2 mm) corresponds to twice the array interval of the lens surfaces 12, 13, 15 and 16 in the X direction (PX=1.2 mm). The beam diameter measurement result is as described in the first embodiment.

In FIG. 21, the measurement result of the LED head 3 of the configuration example 2-1 is indicated by a broken line (reference character E2), while the measurement result of the LED head 3 of the configuration example 2-2 is indicated by a solid line (reference character E3).

As shown in FIG. 21, the difference between the maximum value and the minimum value of the beam diameter in the LED head 3 of the configuration example 2-1 is approximately 5.2 μm, and the difference between the maximum value and the minimum value of the beam diameter in the LED head 3 of the configuration example 2-2 is approximately 5.6 μm. To sum up, in the LED heads 3 of the configuration examples 2-1 and 2-2, the variation in the beam diameter is reduced significantly in comparison with the LED head of the comparative example, in which the difference between the maximum value and the minimum value of the beam diameter is 10 μm.

Next, a description will be given of the result of a print test conducted by equipping the printer 100 (FIG. 1) with the LED heads 3 of the configuration examples 2-1 and 2-2 of the second embodiment. In each LED head 3, the resolution is 1200 dpi and the length of the LED array 30 is 208 mm (corresponding to A4 size). The method of the print test was as described in the first embodiment.

The print patterns shown in FIGS. 20A, 20B and 20C were used as the print patterns. The images after the printing were visually observed and checked, in which images with no vertical stripes or density unevenness were judged to be excellent. Consequently, excellent print results were obtained in the cases of printing with the printer 100 equipped with the LED head 3 of the configuration example 2-1 of the second embodiment and in the cases of printing with the printer 100 equipped with the LED head 3 of the configuration example 2-2 of the second embodiment. From these results, it was confirmed that the occurrence of vertical stripes in the printed image is inhibited also in the LED heads 3 of the second embodiment (configuration examples 2-1 and 2-2).

(Effect of Second Embodiment)

As described above, the lens unit 1 of the second embodiment includes the light blocking plate 21, including the openings 22 each having the opening radius RA, between the first lens plate 11 and the second lens plate 14, and by using ΔFB defined as:

$$\Delta FB = \frac{n\,FE - \sqrt{n^2 FE^2 - (K-1)^2 RA^2}}{K}, \quad (7)$$

the difference ΔF between the paraxial focal length FA and the contour focal length FE satisfies 0.45×ΔFB≤ΔF≤1.79×ΔFB. Therefore, the image surface formed by the lens unit 1 becomes similar in shape to a flat surface and the variation in the beam diameter can be reduced. Accordingly, images of the LED elements 32 that are constant in size can be formed on the image formation surface. Consequently, the occurrence of vertical stripes in the printed image can be inhibited.

Further, since the aforementioned ΔF satisfies 0.04≤ΔF≤0.159, the occurrence of vertical stripes can be inhibited and an excellent print image can be obtained.

Incidentally, while the lenses L1 (L2) on the lens plate 11 (14) are arranged in two lines in a zigzag fashion in the above embodiments, the lens arrangement is not limited to such a configuration; the lenses L1 (L2) may be arranged in a line, for example.

While examples of applying the present invention to a color printer have been described in the above embodiments, the present invention is not limited to such application but is applicable also to other image forming apparatuses such as copy machines, facsimile machines and multifunction peripherals (MFPs), for example. Further, while color printers have been described in the above embodiments, the present invention is applicable also to monochrome printers.

Furthermore, while terms like "up", "down", "right", "left", "front" and "back" have been used in the above description of the embodiments, these terms are used for convenience and are not intended to limit the absolute positional relationship in the state of arranging the lens unit.

While preferred embodiments of the present invention have been described specifically above, the present invention is not limited to the above-described embodiments and a variety of improvements or modifications are possible within the range not departing from the subject matter of the present invention.

What is claimed is:

1. A lens array comprising a plurality of lenses arranged so as to form an array, wherein
   each of the plurality of lenses has an optical axis,
   each of the plurality of lenses is configured so that a contour focal length which is a focal length of a ray incident on a first position separate from the optical axis is longer than a paraxial focal length which is a focal length of a ray incident on a second position in a vicinity of the optical axis, and in each of the plurality of lenses, the second position is closer to the optical axis than is the first position.

2. The lens array according to claim 1, wherein each of the plurality of lenses is an aspherical lens.

3. A lens unit comprising:
a first lens array including a plurality of first lenses arranged so as to form an array; and
a second lens array including a plurality of second lenses arranged so as to form an array, wherein
optical axes of the plurality of second lenses respectively coincide with optical axes of the plurality of first lenses,
each of the plurality of first lenses is configured so that a first contour focal length which is a focal length of a ray incident on a first position separate from the optical axis is longer than a first paraxial focal length which is a focal length of a ray incident on a second position in the vicinity of the optical axis,
each of the plurality of second lenses is configured so that a second contour focal length which is a focal length of a ray incident on a third position separate from the optical axis is longer than a second paraxial focal length which is a focal length of a ray incident on a fourth position in the vicinity of the optical axis,
in each of the plurality of first lenses, the second position is closer to the optical axis than is the first position, and
in each of the plurality of second lenses, the fourth position is closer to the optical axis than is the third position.

4. The lens unit according to claim 3, wherein
the first lens array is arranged on a side of an object while the second lens array is arranged on a side of an image formation surface,
a first distance from the object to the first lens array and a second distance from the second lens array to the image formation surface are substantially equal to each other, and
an upright isometric image of the object is formed on the image formation surface.

5. The lens unit according to claim 4, further comprising a light blocking member that includes a plurality of openings each having an opening radius RA and is disposed between the first lens array and the second lens array, wherein
the plurality of openings of the light blocking member face the plurality of first lenses and the plurality of second lenses,
the first lens array and the second lens array are formed of material that allows light to pass through, and
the first lens array and the second lens array satisfies $0.45 \times \Delta FB \le \Delta F \le 1.79 \times \Delta FB$, where $\Delta F$ represents each of a first difference between the first paraxial focal length and the first contour focal length and a second difference between the second paraxial focal length and the second contour focal length, $\Delta FB$ is determined by $$\Delta FB = \frac{n\, FE - \sqrt{n^2 FE^2 - (K-1)^2 RA^2}}{K},$$

n represents a refractive index of the first lens array and the second lens array,
FE represents each of the first contour focal length and the second contour focal length,
PI represents a distance from each of principal planes of the second lenses to the image formation surface,
FA represents each of the first paraxial focal length and the second paraxial focal length, and
K represents a ratio PI/FA.

6. The lens unit according to claim 3, wherein
a first difference between the first paraxial focal length and the first contour focal length is within a range of 0.04 to 0.159, and
a second difference between the second paraxial focal length and the second contour focal length is within a range of 0.04 to 0.159.

7. The lens unit according to claim 3, wherein
each of the plurality of first lenses is an aspherical lens, and
each of the plurality of second lenses is an aspherical lens.

8. An exposure device comprising:
a light emission section; and
the lens unit according to claim 3, wherein the lens unit according to claim 3 condenses each of light beams emitted from the light emission section.

9. An LED head comprising:
an LED array; and
the lens unit according to claim 3, wherein the lens unit according to claim 4 that condenses each of light beams emitted from the LED array.

10. An image forming apparatus comprising:
an electrostatic latent image bearing body that bears an electrostatic latent image;
a light emission section; and
the lens unit according to claim 3, wherein the lens unit according to claim 4 condenses each of light beams emitted from the light emission section on a surface of the electrostatic latent image bearing body.

11. The lens array according to claim 1, wherein a difference between the paraxial length and the contour focal length is within a range of 0.04 to 0.159.

* * * * *